United States Patent [19]

Kump

[11] Patent Number: 5,256,502
[45] Date of Patent: Oct. 26, 1993

[54] MODULAR, MULTICELL LEAD-ACID BATTERIES

[75] Inventor: William H. Kump, St. Paul, Minn.
[73] Assignee: GNB Incorporated, Mendota Heights, Minn.
[21] Appl. No.: 762,814
[22] Filed: Sep. 17, 1991
[51] Int. Cl.$^5$ .............................................. H01M 2/28
[52] U.S. Cl. ...................... 429/150; 429/82; 429/160; 429/161; 429/187
[58] Field of Search .............. 429/149, 158, 160, 161, 429/187, 87, 88, 150, 53.82, 72, 178, 225

[56] References Cited

U.S. PATENT DOCUMENTS

| | | | |
|---|---|---|---|
| 2,637,759 | 5/1953 | Shannon | 429/161 |
| 2,702,829 | 2/1955 | Chapel | 429/161 |
| 3,844,841 | 10/1974 | Baker | 429/160 X |
| 3,910,800 | 10/1975 | Groby et al. | 429/87 |
| 3,941,615 | 3/1976 | McDowall | 429/149 |
| 4,022,951 | 5/1977 | McDowall | 429/149 |
| 4,209,575 | 6/1980 | McDowall et al. | 429/149 X |
| 4,239,839 | 12/1980 | McDowall et al. | 429/160 X |
| 4,275,128 | 6/1981 | Sano | 429/88 |

Primary Examiner—Anthony Skapars
Attorney, Agent, or Firm—Leydig, Voit & Mayer

[57] ABSTRACT

A modular, multicell battery comprises a plurality of terminal frames, each of which is divided into a number of side-by-side active material support areas pasted with active material to form plates with adjacent plates in each frame being of opposite polarity and adjacent plates in adjoining frames also being of opposite polarity, each terminal frame also including frame positive and negative tabs, a plurality of floating frames similar to the configuration of the terminal frames but not including frame terminal tabs, electrolyte-porous separator frames positioned between adjacent plates in adjoining frames, at least one partition frame dividing the battery into at least two batteries, a positive busbar having a series of slots for accepting the frame positive tabs and electrically connected thereto, a negative busbar having a series of slots for accepting the frame negative tabs and electrically connected to such tabs, the assembly of frames being secured together and electrolyte fill holes for allowing each cell to be filled with electrolyte and a cover secured to the assembly of frames. In one embodiment of the invention, the cover includes venting means, the partition means includes apertures positioned above the electrolyte level of the battery and the positive busbar includes a switch actuator and a switch assembly allowing one or all parts of the battery to be placed in service, and the positive and negative busbars having the desired termination formed, as by die casting, thereon.

46 Claims, 14 Drawing Sheets

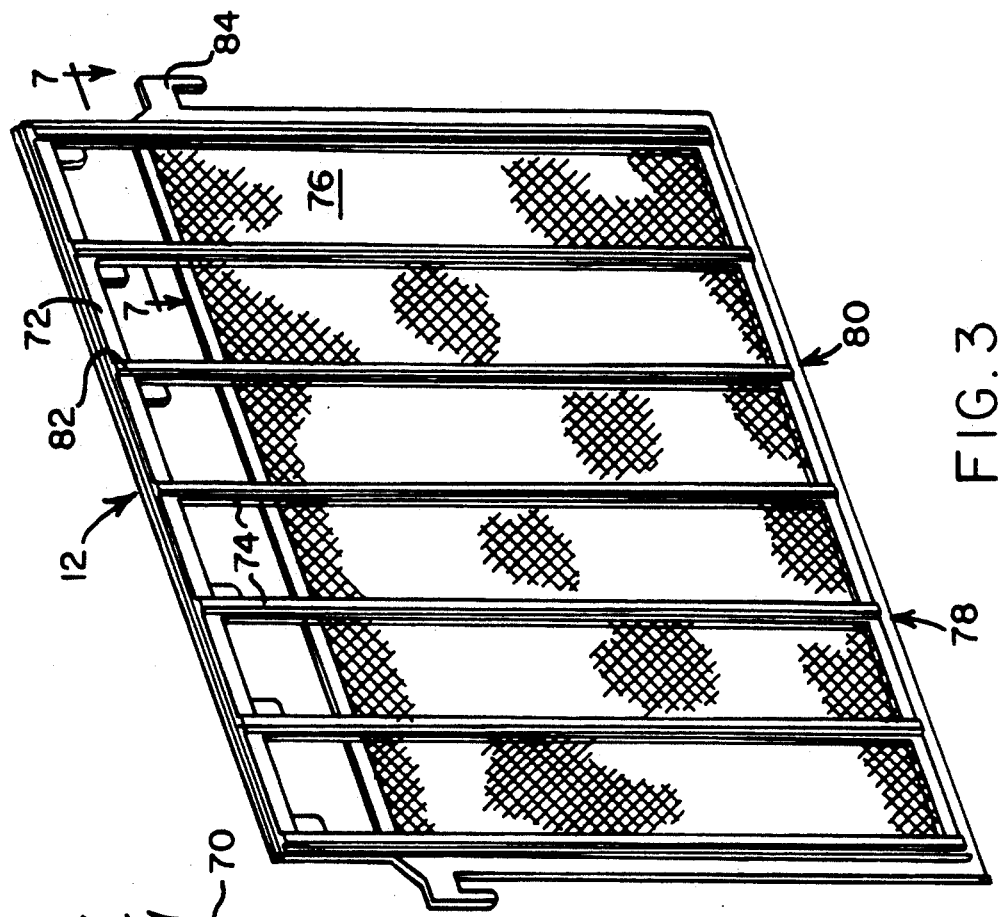
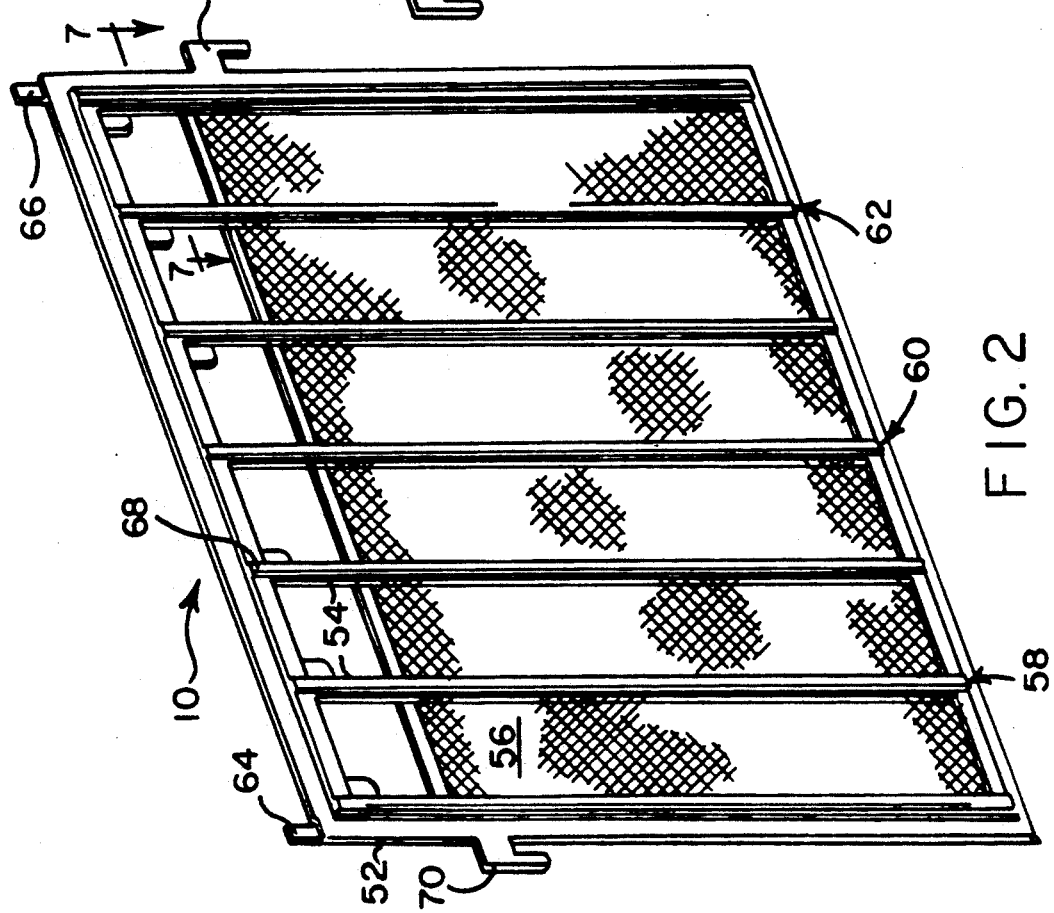
FIG. 2
FIG. 3

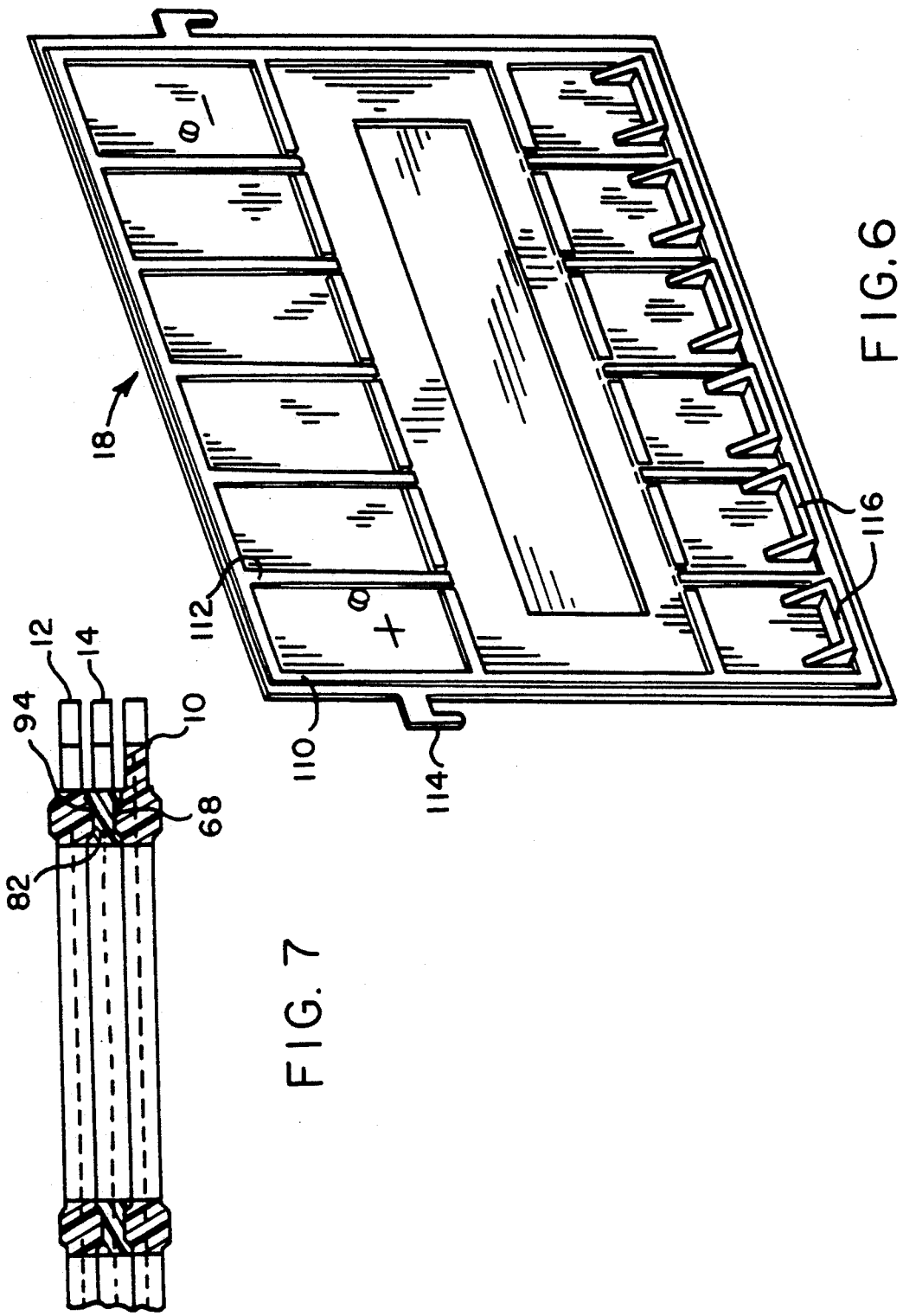

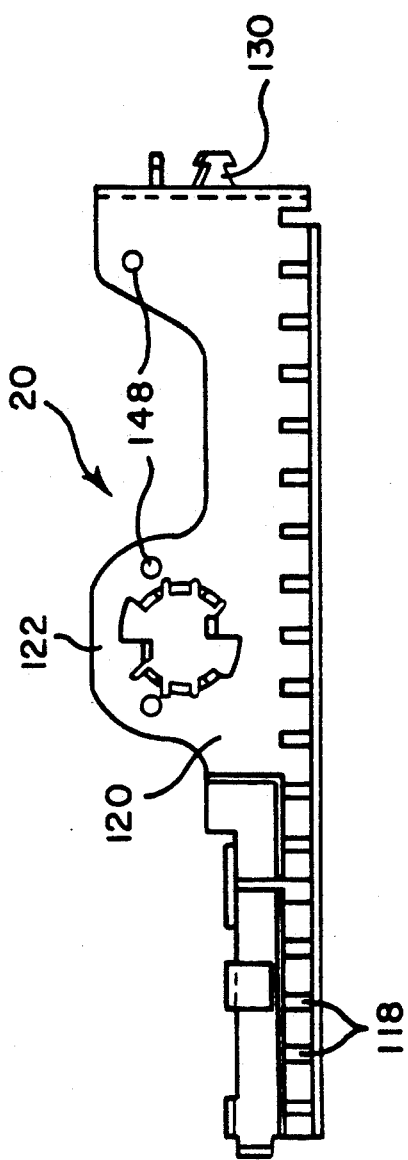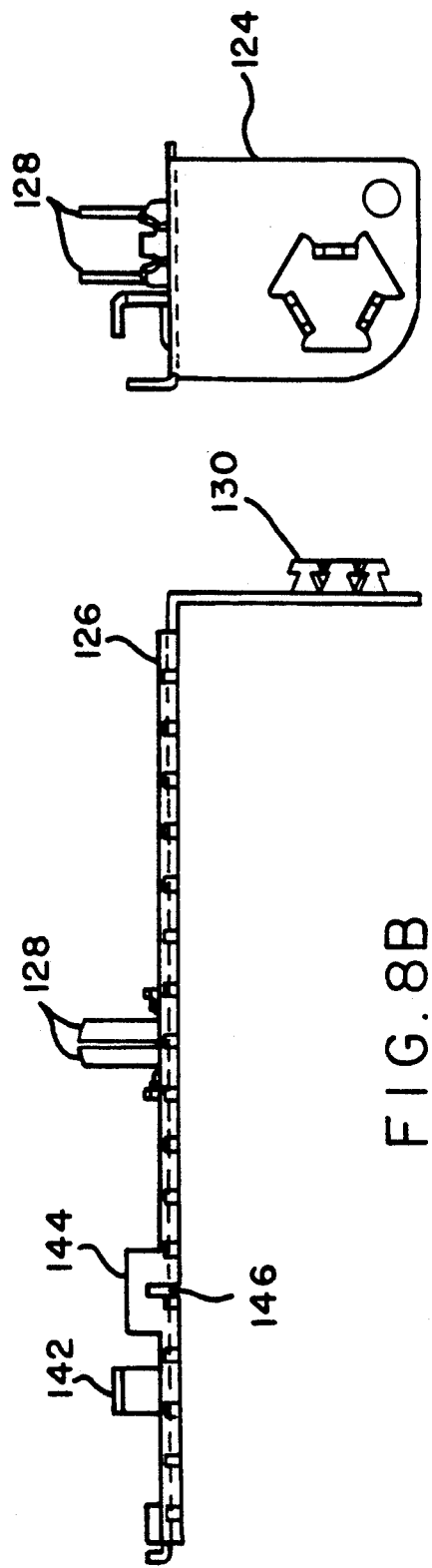

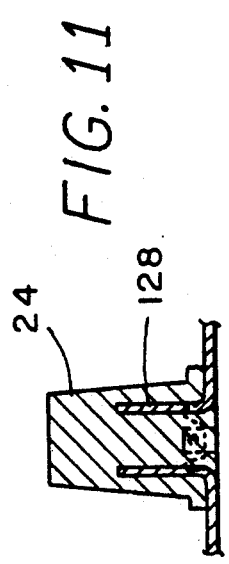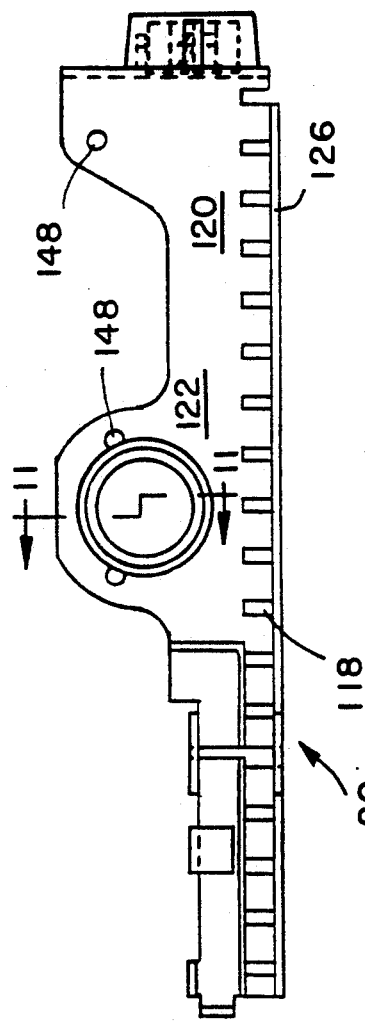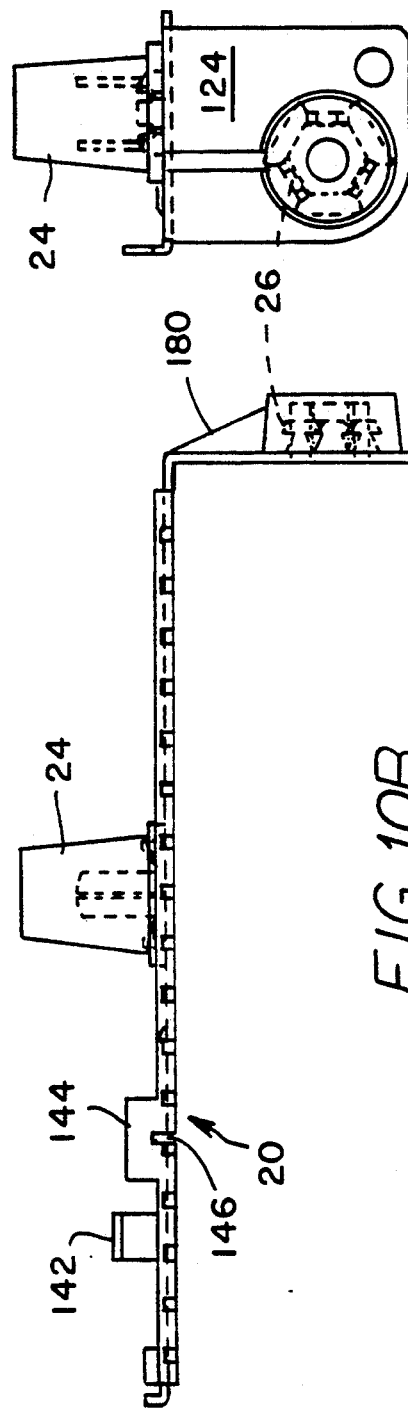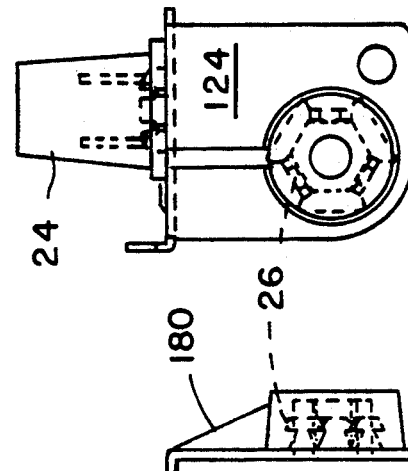

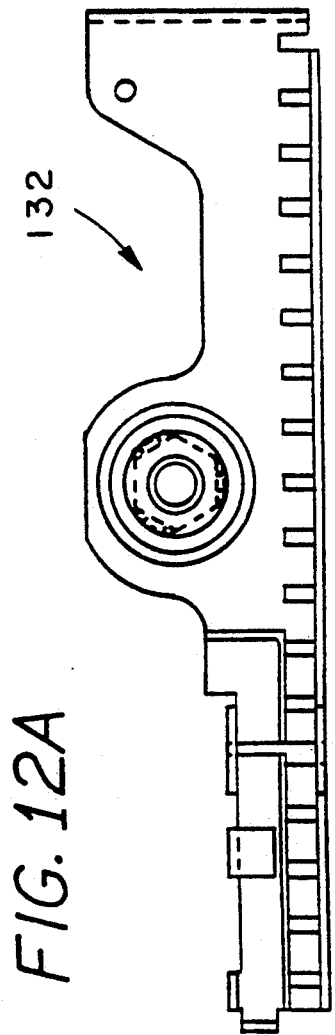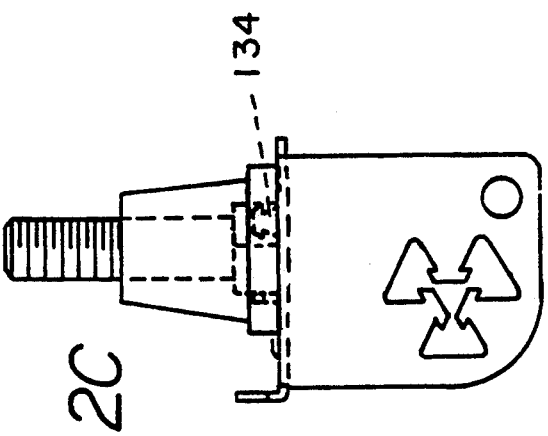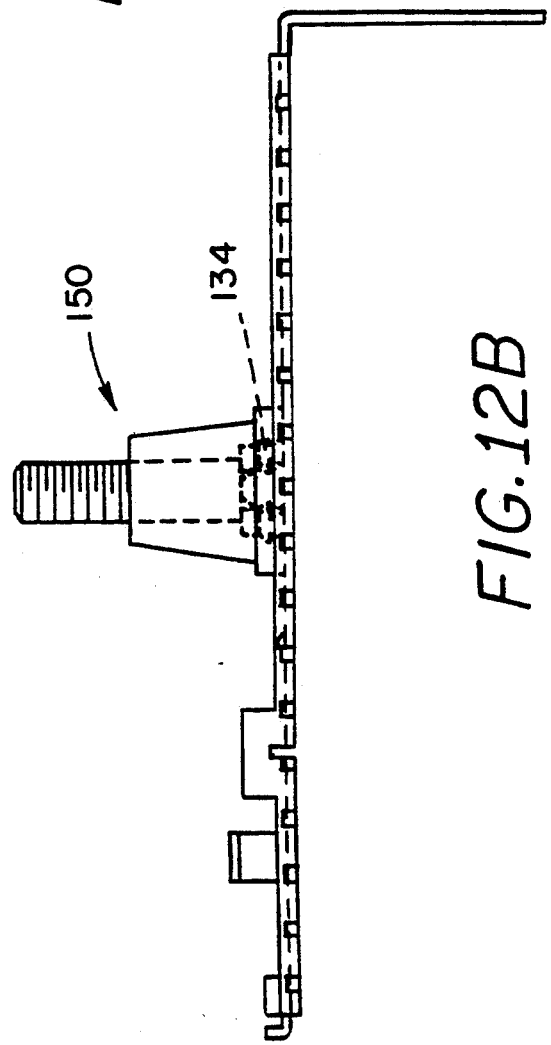

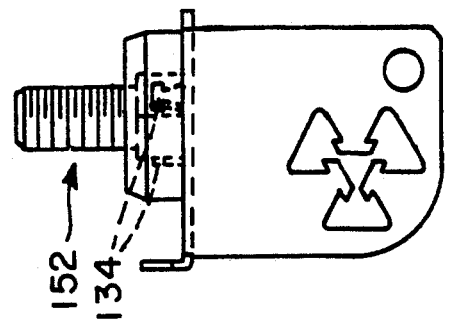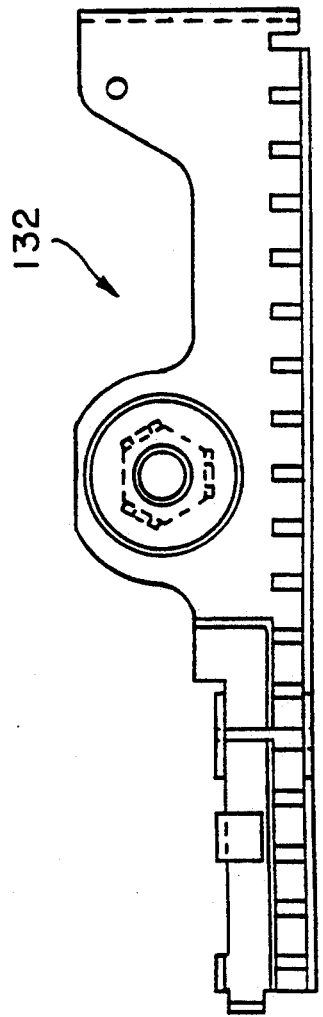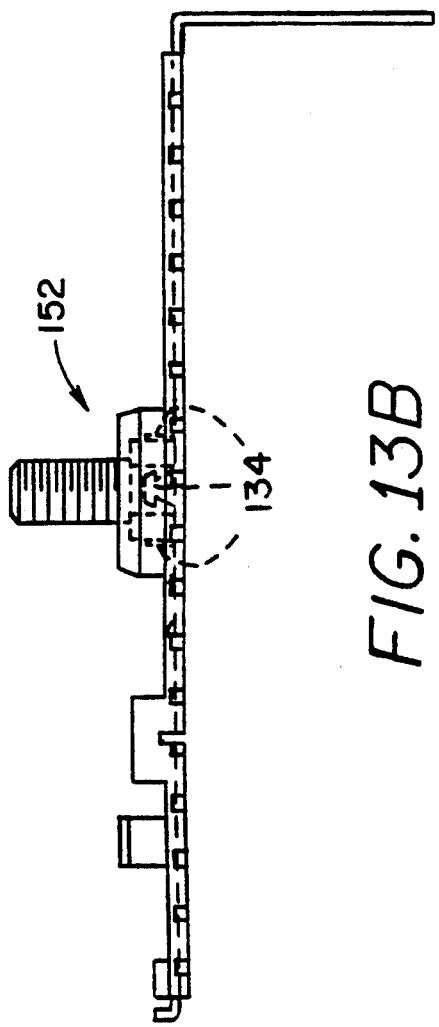

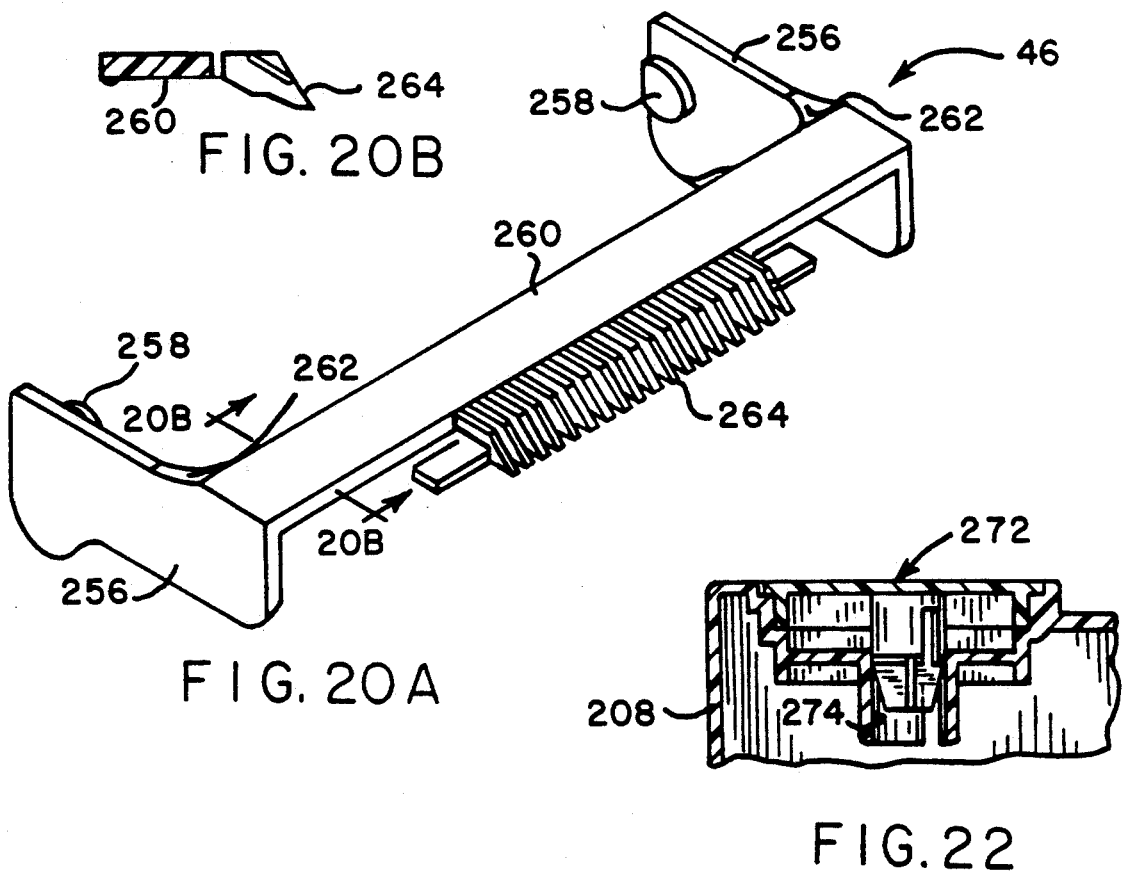
FIG. 20B
FIG. 20A
FIG. 22
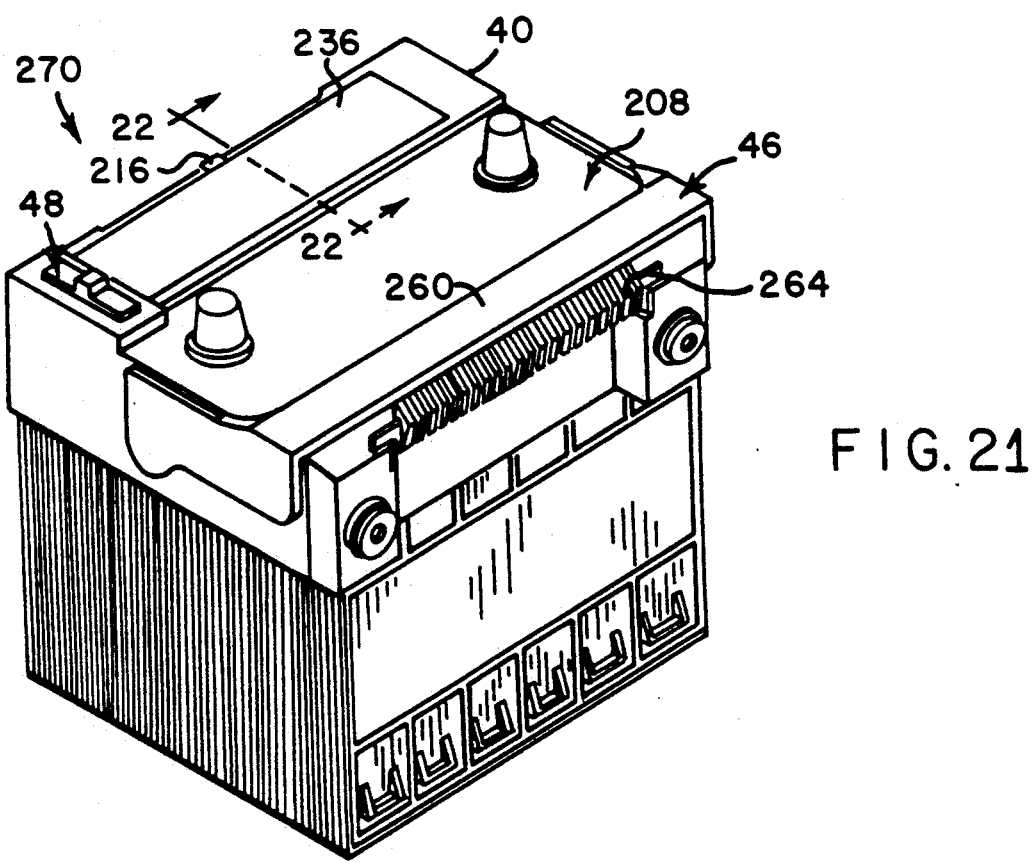
FIG. 21

MODULAR, MULTICELL LEAD-ACID BATTERIES

RELATED APPLICATION

Rao, U.S. Ser. No. 07/680,809, filed Mar. 26, 1991, now U.S. Pat. No. 5,126,217 for: "Frame for Modular, Multicell Lead-Acid Batteries and Such Modular Batteries".

This invention relates to modular, multicell, lead-acid batteries.

BACKGROUND OF THE INVENTION

U.S. Pat. Nos. 3,941,615; 4,022,951 and 4,209,575 all disclose modular, multicell batteries of particularly unique configurations. In general, such multicell batteries comprise a plurality of frames, each of which is divided into a number of side-by-side active material support areas. The frames are assembled and secured together in a stacked formation so that the perimeter partitions of the frames form the top, bottom and two opposite sides of the battery and the divisions in the frames form cell partitions. Each frame is pasted with active material to form plates with adjacent plates in each frame being of opposite polarity and adjacent plates in each frame being of opposite polarity and adjacent plates in adjoining frames also being of opposite polarity. An electrolyte-porous separator material is provided between adjacent plates in adjoining frames.

U.S. Pat. No. 4,239,839 shows a similar type of battery. However, in the battery illustrated therein, a barrier frame is interposed and secured in the assembly of frames. This barrier or partition frame forms a chemical and electrical barrier between active battery material and frames on opposite sides of the barrier member. By this means, the battery illustrated is effectively divided into two separate batteries. The relative capacity of each such battery can be pre-established, as may be desired for the intended application.

The modular, multicell battery described in the aforementioned patents represents a total departure from traditional, lead-acid battery constructions used for SLI automotive and truck applications and for marine use. Freed from the restrictions of the conventional, premolded container, the capacity of such unique modular batteries can be increased merely by adding more frames and separators.

The advantages of using this type of battery can be substantial. Such modular batteries are susceptible to production in a highly automated manufacturing process and can conceptually involve fewer components than are utilized in conventional lead-acid batteries.

Moreover, from the performance standpoint, such modular batteries can deliver performance equivalent to conventionally made lead-acid batteries with less weight. Indeed, such modular batteries can deliver up to about 30% more current or power output per pound than does a conventional lead-acid battery at 60° F. and higher, due to the shorter current path and due to the lower solid electrical resistance component of the total battery electrical resistance. This accordingly means that, at such elevated temperatures, such modular batteries have lower electrical resistance than a conventionally designed automotive battery of equivalent size. A further advantage of modular batteries of this type is that there should be no intercell connection failure mode in such modular batteries in contrast to conventionally designed automotive batteries in which intercell weld or connection failure in service is one of the principal failure modes.

Modular, multicell batteries of this type are in commercial use, currently being made and sold by the assignee of the present invention. While considered advantageous, the present commercial modular batteries have less than desired characteristics in some respects. First of all, such commercial batteries include many more parts than would be preferred for facile production. Further, several of the parts employed must be assembled with nuts and bolts, or the like. Under some conditions of use, the resulting vibration resistance is less than optimum. Still further, the busbars used have been somewhat susceptible to corrosion. Also, the present commercial design does not allow the optimum flexibility and versatility in manufacture or in performance.

It is accordingly an object of the present invention to provide a modular, multicell battery capable of greater reliability in service. A more specific and related aspect of the present invention provides batteries of this type having substantial resistance to vibration. Yet another specific object is to provide such a modular battery with improved venting means and which allows substantial flexibility in the modes of recharge that can be employed.

Another object of this invention provides a modular, multicell battery which is economical to make and assemble. A more specific and related object lies in the provision of such a battery having a minimum number of components.

A still further object of this invention provides a battery of this type having desirable resistance to corrosion.

Yet another object of the present invention lies in the provision of a modular, multicell battery that readily can be adapted to a specific end use application.

Other objects and advantages will be apparent as the following description proceeds taken in conjunction with the accompanying drawings.

SUMMARY OF THE INVENTION

In accordance with the present invention, there is provided a modular, multicell lead-acid battery having busbars with the desired terminals formed thereon. The particular busbars are suitably electrically connected to the plates of the battery in a fashion which allows visual inspection of such electrical connections. A cover is provided which, in the more preferred embodiment, includes venting means. In that preferred embodiment, when the busbars are positioned on top of the battery, flexibility in the modes of recharge that may be employed is allowed, the electrolyte to be added to the battery can be efficiently controlled, and the total amount of electrolyte can be maximized. Still further, the battery can be tailored to a specific end use application, simply by utilizing the particular busbar configuration suitable for such application and then forming the desired terminal on the busbar.

While the invention is susceptible of various modifications and alternative forms, the specific embodiments thereof will be shown by way of example in the drawings and will hereafter be described in detailed. It should be understood, however, that it is not intended to limit the invention to the particular forms disclosed, but, on the contrary, the intention is to cover all modifications, equivalents and alternatives falling within the

BRIEF DESCRIPTION OF THE DRAWINGS

FIG. 2 is a perspective view of a terminal frame used in the batteries of this invention;

FIG. 3 is a perspective view of a floating frame utilized in the batteries of the present invention;

FIG. 6 is a perspective view of an end frame which may be used in the present invention;

FIG. 7 is a partial cross-sectional view taken generally along the lines 7—7 of FIGS. 2-4, showing how the terminal frame of FIG. 2, the floating frame of FIG. 3 and the separator frame of FIG. 4 fit together;

FIGS. 8A-8C are, respectively, a top, front, and end elevation view showing one embodiment of a positive busbar having a configuration suitable for accommodating a top and side terminal for an SLI automotive battery that may be utilized in a preferred embodiment of the present invention;

FIGS. 10A-10C are, respectively, a top, front, and end elevation view of the positive busbar of FIGS. 8A-8C having an SLI top and side terminal formed thereon;

FIG. 11 is a cross-sectional view taken generally along the line 11—11 of FIG. 10A and showing the position of the busbar top terminal tabs in relation to the top terminals;

FIGS. 12A-12C are, respectively, a top, front, and end elevation view and showing the positive busbar of FIGS. 9A-9C with a terminal suitable for a marine application;

FIGS. 13A-13C are, respectively, a top, front, and end elevation view of the positive busbar of FIGS. 9A-9C having a terminal suitable for a truck application;

FIG. 20A is a perspective view illustrating a handle that may be employed, if desired;

FIG. 20B is a cross-sectional view taken generally along the line 20B—20B of FIG. 20A and showing further details of the handle;

FIG. 21 is a perspective view of an assembled modular multicell battery of the present invention, partially cutaway to show an electrolyte fill hole;

FIG. 22 is a cross-sectional view taken generally along line 22—22 of FIG. 21 and showing a vent positioned in an electrolyte fill hole;

DETAILED DESCRIPTION OF THE INVENTION

Figure 1:
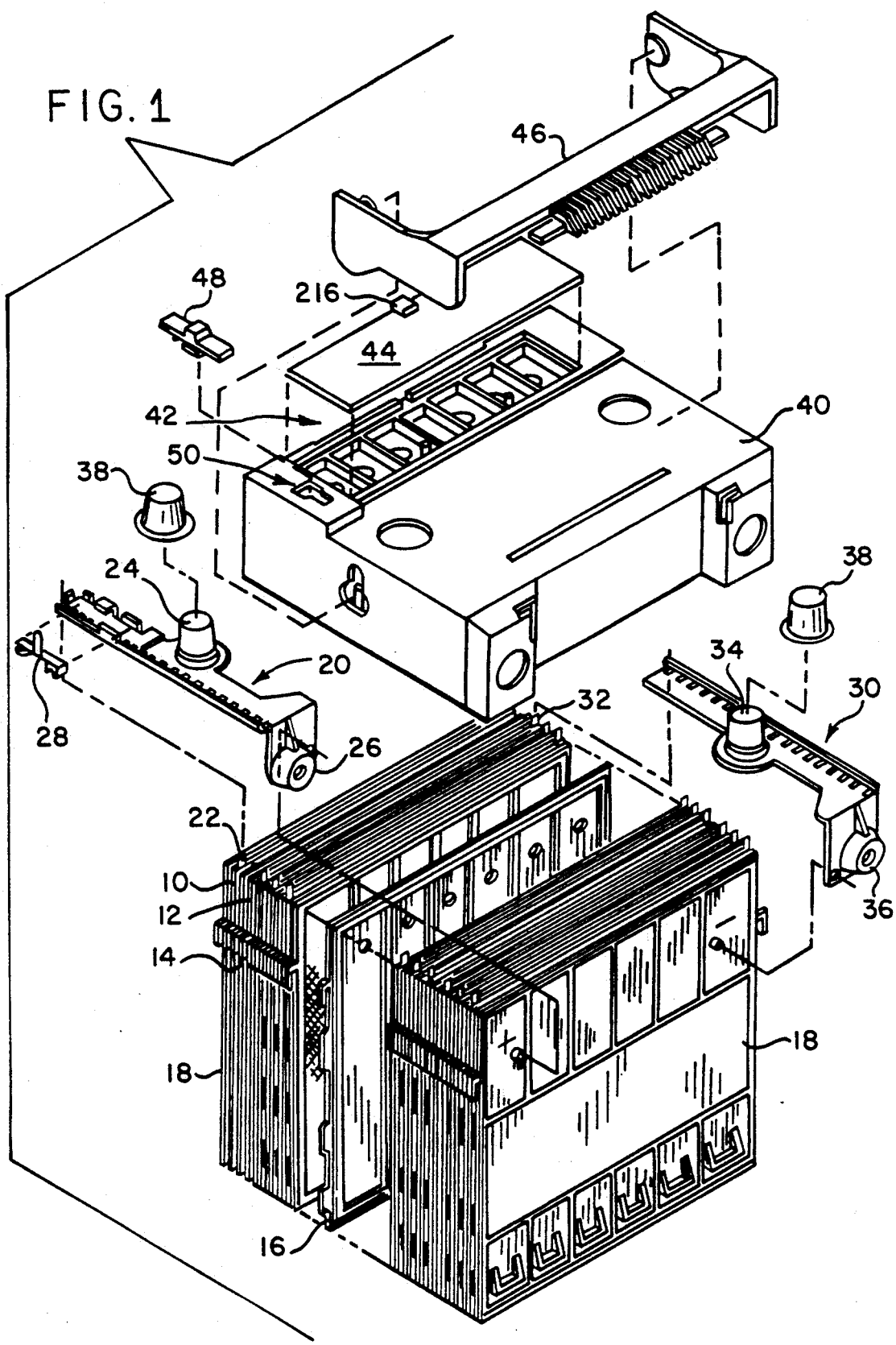
FIG. 1 is an exploded perspective showing one embodiment of a modular, multicell battery in accordance with the present invention.

FIG. 1 shows an illustrative embodiment of the modular, multicell battery of the present invention that is partitioned to provide a main battery and a reserve battery. As seen in FIG. 1, the exemplary battery includes terminal frames 10, floating frames 12, separator frames 14 positioned between the terminal and floater frames 10 and 12 and a barrier or partition frame 16. The side walls of the battery are formed by end frames 18, positioned at each end of the stacked assembly of frames. When assembled and secured together in sealed relationship, the perimeter of the thus-assembled frames comprises the top, bottom and adjoining two ends of the battery. A positive busbar shown generally at 20 is electrically connected to the frame positive tabs 22 of the terminal frames 10. While any desired termination means may be employed, the illustrative embodiment shows the positive busbar 20 having formed thereon a top terminal 24 and a side terminal 26 suitable for an SLI automotive battery application. The positive busbar-terminal assembly can be handled during battery assembly as a unitary component. The positive busbar 20 also has positioned thereon a switch assembly 28 which, in the illustrative embodiment, moves from a forward position (when the main battery is in use) to a rearward position which also brings into service the auxiliary or reserve battery, such as would be needed, for example, when the main battery has been discharged due to leaving the lights of the automobile on for an extended period of time, leaving inadequate power in the main battery to start the automobile.

A negative busbar shown generally at 30 is likewise electrically connected to the frame negative tabs 32 of the terminal frames 10, when assembled. The negative busbar 30 shown includes a top terminal shown generally at 34 and a side terminal shown generally at 36 suitable for an SLI automotive battery application.

Optional plastic terminal protector caps 38 for the top and side terminals may also be utilized, if desired. Such terminal protector caps are, of course, well known and in commercial use.

A cover shown generally at 40 for the battery is provided. In the illustrative embodiment, the cover 40 includes a venting system shown generally at 42, and a manifold 44 for the venting assembly that is assembled in the cover 40. An optional handle 46 may be assembled to the cover for transporting the battery.

In addition, a switch actuator 48 is inserted into the cover 40 in the notched portion 50. The switch actuator 48 cooperates with the switch assembly 28 to allow placing the reserve battery into service when desired.

FIG. 2 shows the terminal frame 10 employed in the modular multicell battery shown in FIG. 1. Functionally, the terminal frame 10 comprises a frame portion shown generally at 52, having frame partitions 54 separating the frame into side-by-side cells. The current collection means comprises, in part, a mesh grid 56 embedded, as during injection molding, into the frame portion 52. The mesh grid 56 is cut as shown at 58, 60 and 62 so that the terminal frame 10 is divided into a single cell adjacent to the sides of the frame and two internal double cells. As may be appreciated, the mesh grid 56 extends through the partitions 54 in those double cells, thus serving as an intercell connector.

The current collection means also includes a conductive strip electrically connected to both the mesh grid 56 and an external busbar. It has been thus found suitable to provide copper strips soldered or otherwise electrically connected to the mesh grid 56. If desired, one side of the copper mesh may be pre-soldered to facilitate subsequent soldering operations. The frame positive tab 64 of copper strip is connected to a positive busbar, and a frame negative tab 66 of copper strip is connected to a negative bus bar.

Pursuant to one aspect of a more preferred embodiment of the present invention, the frame partitions 54 of the terminal frames 10 are shaped to interfit and provide a desirable welding or sealing surface when the respective frames are assembled together. In the illustrative embodiment shown in FIG. 2, the frame partitions 54 each have a raised, flat tongue portion shown generally at 68, which interfits with a groove in other frames as will be discussed later herein.

The terminal frames 10 can be made of any desired plastic material that may be used in lead-acid battery systems. However, it will generally be more desirable to utilize for the terminal frames (and the floating and separator frames as well) a plastic material that, under the conditions of molding or the like employed to make the frame, does not result in any significant buckling of the mesh grid 56, such as could occur due to shrinkage of the plastic material when the terminal frame 10 is made by injection molding. In this regard, it has been found suitable to utilize polypropylene filled with glass fibers to minimize shrinkage during injection molding. Suitable plastic materials of this type are commercially available.

As to the material for the mesh grid 56, any suitable lead-based alloy useful for lead-acid batteries may be employed. It is, however, preferred to use the calcium-tin-lead alloys described in the pending Rao application, assigned to the assignee of the present invention and identified herein. The mesh thickness may vary as desired. As one example, a thickness of about 0.029 inch has been found suitable.

The frame portion 52 includes a pair of hooks 70 that may be employed for facilitating handling of the frames in battery assembly. Further, and as will be described in more detail herein, the hooks 70 provide a surface that can be sealed or welded to the cover to provide support, particularly when a handle 46 is used.

FIG. 3 shows a floater frame 12 that can be utilized to form the modular, multicell battery illustrated in FIG. 1. A main distinction between the floating frame 12 and the terminal frame 10 is that the floating frame 12 does not include any frame terminal tabs. The floating frames 12 thus include a frame portion 72, a series of frame partitions 74 dividing the floating frame 12 into a series of side-by-side cells as is the case with the terminal frame 10. However, the mesh 76 embedded in the floating frame 12 is cut at 78 and 80 so as to provide three sets of two interconnected cells.

As is the case with the terminal frame 10, the floating frame 12 in a preferred embodiment has a configuration for the frame and partitions which facilitates the frames to be readily secured together by vibration welding, sealing or the like. Thus, the frame portion and partitions include a tongue surface shown generally at 82. Likewise, the floating frame 12 includes a pair of hooks 84 having the functions described in connection with the terminal frame 10.

The positive and negative active material areas within the cells formed by the respective partitions are filled with conventional lead-acid positive and negative active material. As may be appreciated, the particular paste densities will vary depending upon the particular application involved. As one example, suitable densities for the active material paste can vary from about 3.2 to 3.8 grams per cubic centimeter, while the density for the negative paste may vary from about 3.2 to 4.1 grams per cubic centimeter.

The terminal and floating frames in the frame assembly are separated by a suitable separator. To that end, a separator frame 14 includes a separator 86 embedded in a frame portion 88 having partitions 90 similarly dimensioned to those in the terminal and floating frames 10 and 12. Any material suitable of functioning as a separator in a lead-acid battery system may be employed. It has been found suitable to utilize a glass fiber material, such as has been used as a separator for conventional lead-acid batteries. Of course, the thickness of the separator employed should be consistent with the thickness of the mesh employed. A thickness of about 0.010 inches has been found suitable but can vary as desired.

In similar fashion to the terminal and floating frames, the separator frame 14 includes a pair of hooks 92 having the same functions as previously described in connection with the terminal frames. Also, pursuant to a more preferred aspect of the present invention, the separator frame 14 includes an exterior frame partition surface compatible with that of the terminal and floating frames for facilitating welding, sealing or the like. To this end, the separator partitions include a flat groove surface 94. Further to another aspect of the preferred embodiment of this invention, the separator frame includes projections 96 to facilitate alignment when the respective frames are secured together, as by welding or the like.

Figure 5:
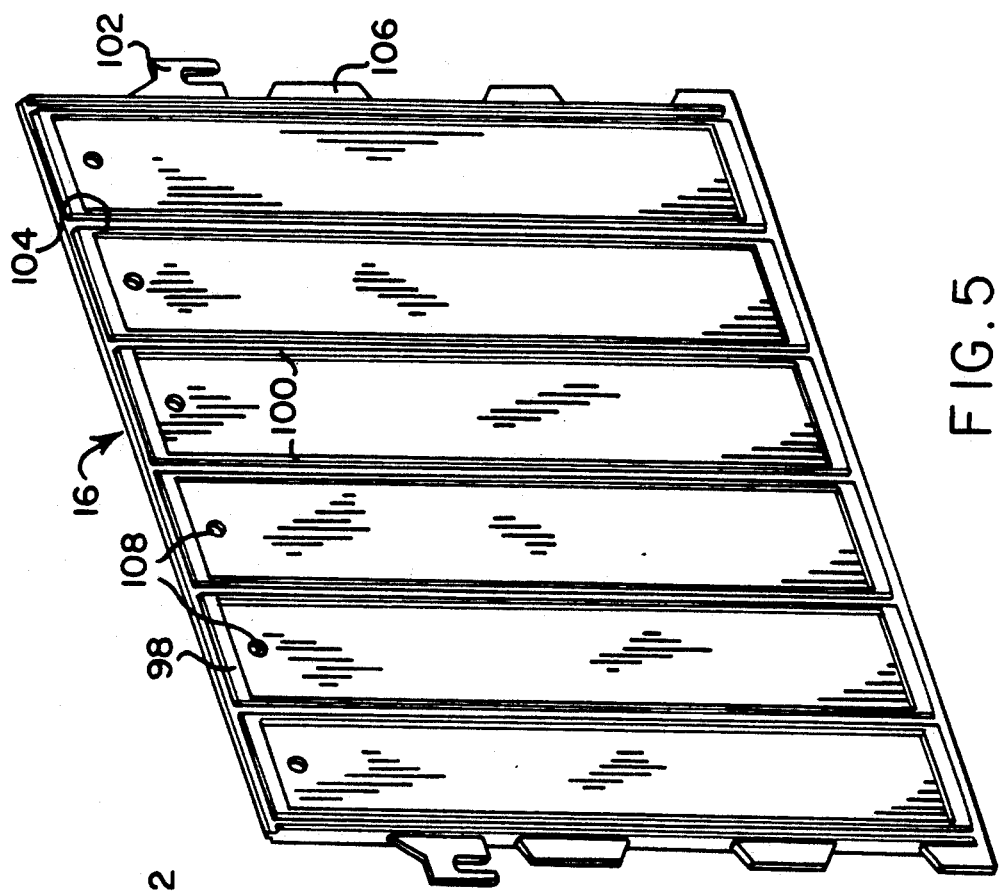
FIG. 5 is a perspective view of a barrier frame utilized in a preferred embodiment of the present invention.

In accordance with yet another aspect of this invention, it is desirable for some applications to partition the total battery capacity into two or more batteries. To this end, FIG. 5 shows a partition or barrier frame 16 which serves to electrochemically partition the overall battery into two batteries. In the illustrative embodiment, the partition frame 16 divides the modular, multicell battery of the present invention into a main battery and a reserve battery.

The partition frame 16 thus has a frame portion 98, a series of frame partitions 100 similar to those in the other frames, and a pair of hooks 102. According to the more preferred aspect of the present invention, the partitions are thus formed with the flat groove configuration 104 similar to the separator frame 14. Likewise, the partition frame 16 includes a series of projections 106 to assist in alignment during assembly of the frames as discussed in conjunction with the separator frames.

Pursuant to one of the more preferred aspects of the present invention, the partition frame 16 includes venting means communicating between the main and reserve portions of the battery. To this end, the partition frame 16 has a series of apertures 10B, one being positioned in the top portion of each cell formed between the frame partitions 100. The aperture 108 should be located above the typical level of the electrolyte to facilitate venting of any internal gasses. Multiple apertures in each cell can, of course, be provided should this be desired, and the size can vary as considered desirable. As one example, it has been found suitable to utilize circular holes of about 0.12 inch in diameter.

FIG. 6 shows an end frame 18 suitable for use in conjunction with the modular, multicell battery of the present invention. The end frame 18 thus includes a frame 110 and partitions 112 dimensioned similarly to the partitions of the other frames. In similar fashion to the other frames, the end frame 18 also includes a pair of hooks 114. The outside of the end frame 18 includes a configuration suitable for a conventional battery bottom holddown, such as is shown generally at 116.

The partition frame 16 and the end frames 18 can be made out of any plastic material desired that can be welded or sealed in assembling the frames and which is suitable for lead-acid battery materials. It is, however, unnecessary to include a reinforcement in the plastic material to reduce shrinkage as is desired for forming the terminal, floating and separator frames.

As may be appreciated, the selection of the plastic material for the respective frames should take into account the type of welding or sealing technique desired to secure the respective frames together, so that, for example, an appropriate melt density is selected. The open configuration of the respective frames eliminates any flash traps and allows the plastic to flow during assembly. Thereafter, the thus-assembled and secured frames can be cleaned without any water used in the cleaning being retained.

FIG. 7 shows how the tongue and groove of the respective frames interfit. As illustrated, the tongues 68 of a terminal frame 10 interfit with the grooves 94 of a separator frame 14 as do the tongues 82 of the floating frame 12.

The capacity of the battery can, of course, be determined by selecting the number of sets employed, one set comprising a terminal and floating frame with a separator frame positioned therebetween. It has been found that one set having the exemplary configuration discussed herein will typically provide a capacity of about 35 cold cranking amps or so. The particular configuration (e.g., the thickness of the frames) will of course dictate to a great extent the capacity. For SLI automotive battery applications as one example, the number of sets can range from 5 or even less up to about 20 or so. As one example for SLI applications where a partitioned battery is desired, it has been found suitable to utilize about 18 sets with the reserve battery having 5 sets and the main battery having 13 sets.

Pursuant to an important aspect of the present invention, the tabs of the terminal frames are electrically connected to a busbar in a manner which allows visual inspection after completion of the connection, as well as providing versatility in manufacture and use over a wide variety of applications. To this end, and in the illustrative embodiment shown in FIGS. 8A–8C, a positive busbar 20, suitable for an SLI automotive battery application, includes a series of slots 118 aligned to accept therethrough the frame positive tabs 22 of the terminal frames 10.

The positive busbar 20 includes a main portion 120 in which the slots 118 are formed, a top terminal portion 122 upon which a top terminal can be formed and a skirt portion 124 upon which a side terminal can be formed. If desired, the busbar may include a reinforcing means, such as provided in the exemplary embodiment by the upturned edge portion 126.

A further and preferred aspect of this invention includes means to impart superior torque resistance to the termination means used for the particular application. To this end, top and side terminal tabs 128 and 130 are provided. The number, size and location of such tabs may be varied as desired, consistent with the objective of providing satisfactory terminal torque resistance.

The positive busbar may be made out of any electrically conductive material and may be formed by any means desired. It has been found suitable to form the busbar from a copper sheet of about 0.06 inch thick by metal stamping. The top and side terminal tabs 128 and 130 may be bent into position for forming the terminals from a flat, stamped sheet by using an upsetting tool, as is known. If desired to improve corrosion resistance, the copper busbar may be electroplated with a tin coating.

A single busbar may be used for all SLI automotive batteries regardless of the desired termination means. If a dual terminal battery (i.e., a set of top terminals and a set of side terminals) is desired, the tabs of both the top terminals and side terminals are upset. If the battery is only to have a set of top terminals, only those tabs are upset. Similarly, when a battery with only side terminals is desired, only the side terminal tabs are upset.

In the illustrative embodiment, the top terminal portion 122 is located intermediate the ends of the busbar so that, when placed in service, the top terminal can accommodate the battery cables regardless of how the battery is positioned, viz., the battery is neither right-nor left-handed. While preferred to simplify inventory control, the top terminal portion and terminal (and the side terminal as well) can be positioned as needed for the particular end use application.

Figure 9C:
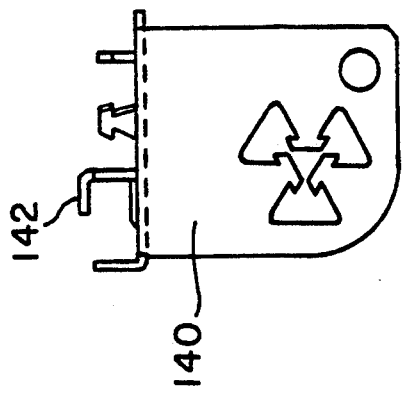
FIGS. 9A-9C are, respectively, a top, front, and end elevation view showing a positive busbar that may be employed for marine and truck applications.
Figure 9A:
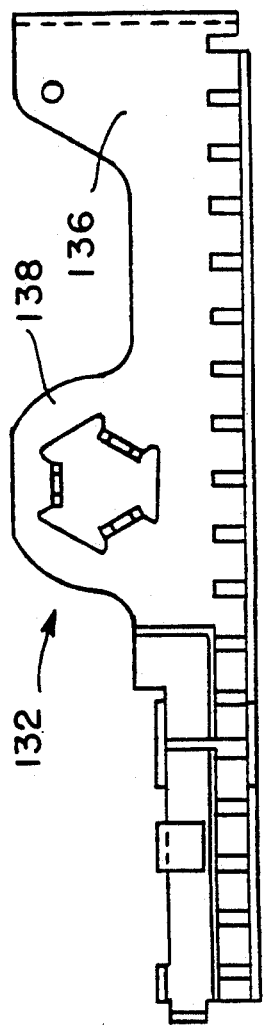
Figure 9B:
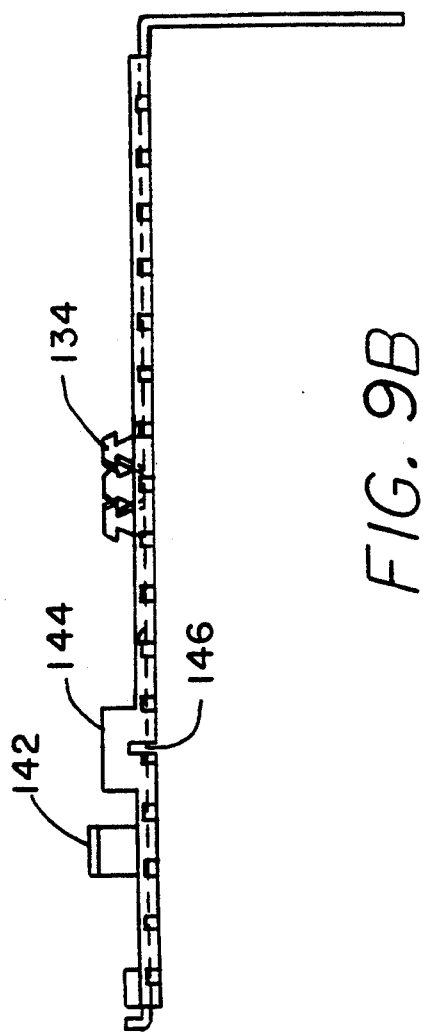

In accordance with one aspect of a preferred embodiment of the present invention, the busbar for marine and truck applications is essentially of the same configuration as that used for SLI automotive battery applications. As shown in FIGS. 9A–9C, for marine and truck applications, the positive busbar 132 thus includes three spaced top terminal tabs 134. Otherwise, the busbar 132 is essentially identical to the SLI automotive busbar of FIGS. 8A–8C, having a main portion 136, a top terminal portion 138, and a skirt portion 140.

As was the case with the positive busbar for an SLI automotive battery application, the size, number, location and configuration of the top terminal tabs in the marine and truck busbar can vary as desired, consistent with the desired objective of providing torque resistance for the terminal. Similarly, the position of the top terminal portion may be altered as considered appropriate, consistent with the ability to accommodate the battery cables for the particular application.

In accordance with yet another aspect of the present invention, the positive busbars 20 and 132 are provided with a means for positioning, when utilized, a switch assembly. To this end, positioning arm 142 is provided for holding, as will hereinafter be described, the switch assembly in its proper position. As may be appreciated, the positioning arm 142 needs to be electrically insulated from the positive busbar. This can be readily achieved by utilizing a plastic insulating cap, as will be later described.

Yet another aspect of the present invention provides a positive busbar having a bridge means that may be severed when a switch-type of battery is desired. To this end, the positive busbars 20 and 132 include a bridge portion 144 that may have, to facilitate the cutting step, a notch shown generally at 146. If a switch-type of battery is not desired, the busbar is used as shown. If a switch is to be provided, after electrically connecting the busbar with the terminal tabs and thereafter forming the battery, the bridge portion 144 can be cut to divide the busbar into two parts which are not electrically connected.

The busbars for the various applications can be made out of a common stamped part. All that is needed is to select the die insert having the appropriate terminal tabs for the particular end use application. For marine and truck applications, the side terminal is not used. The top terminal tabs 134 are upset as previously described, the appropriate bolt is positioned and the lead top terminal formed on the busbar as desired.

Pursuant to one aspect of this invention, the desired termination means may be readily formed on the busbar to thereby provide a unitary component, facilitating battery assembly. To this end, FIGS. 10A-10C shows the busbar of FIGS. 8A-8C having SLI top and side terminals. The terminals may be formed onto the busbar by any conventional means desired. Casting techniques are well known and may be utilized. It is preferred to form the terminals onto the busbar by die casting techniques, which techniques are known in the art. If desired, the busbar 20 may be provided with alignment means for proper positioning of the busbar during casting. Location holes 148 thus allow proper positioning in the die.

A further aspect of the present invention provides a unitary busbar and terminal assembly wherein the terminal tabs cooperate to increase the torque resistance of the terminal as has been previously discussed. To this end, as best seen in FIG. 11, the top terminal 24 has been die cast in such a fashion that the top terminal tabs 128 are embedded within the top terminal 24. The embedment of the top terminal tabs thus provides, as may be appreciated, in effect an anchor for the top terminal 24 to resist rotation upon application of torque to that top terminal.

In similar fashion, as shown in FIGS. 10A and 10B, the side terminal tabs 130 impart torque resistance to the side terminal generally shown at 26. Thus, the side terminal tabs 130 desirably provide an interference fit with the nut part of the side terminal.

The functioning of the unitary busbar terminal assembly is the same when used in marine and truck applications. As is thus seen in FIGS. 12A-12C, the positive busbar shown generally at 132 has the marine terminal shown generally at 150 die cast thereon. The top terminal tabs 134 again impart torque resistance to the terminal 150. This is likewise the case with the busbar terminal assembly for a truck application as seen in FIG. 13.

The busbar 132 has the truck terminal 152 die cast on the busbar 132; and the top terminal tabs 134 form an interference fit so as to again impart torque resistance to the terminal 152.

The negative busbars may be configured, and function, similarly to the positive busbars, except that no provision is needed for accommodating a switch assembly when the positive busbar has that capability. In other words, while it has been found suitable to have the positive busbar include the means for accommodating a switch assembly, the negative busbar could include such means if that were considered to be desirable.

Figure 14:
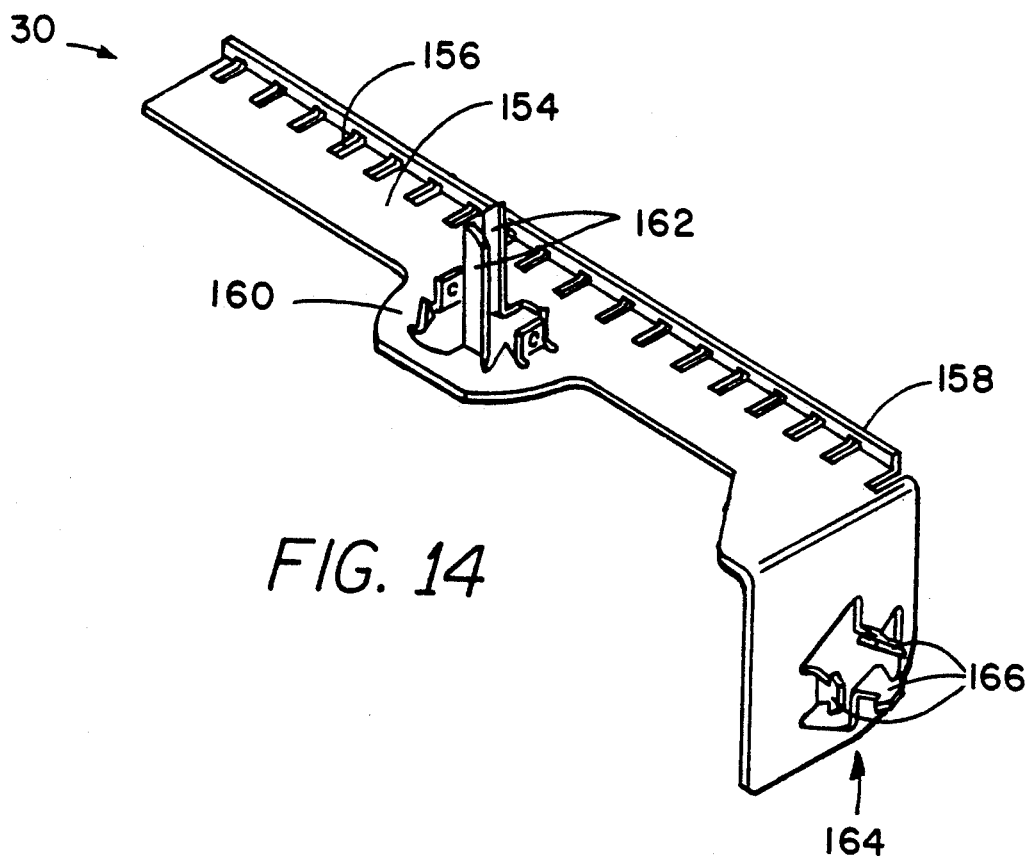
FIG. 14 is a perspective view of a negative busbar for a SLI automotive application that may be used in the modular batteries of this invention.

As shown in FIG. 14, a negative busbar 30 for an SLI automotive battery application comprises a top portion 154 having slots 156 for accepting the terminal tabs of the terminal frames and an upturned reinforcement lip 158, a top terminal portion 160 having top terminal tabs 162 and a side terminal portion 164 having side terminal tabs 166.

Figure 15:
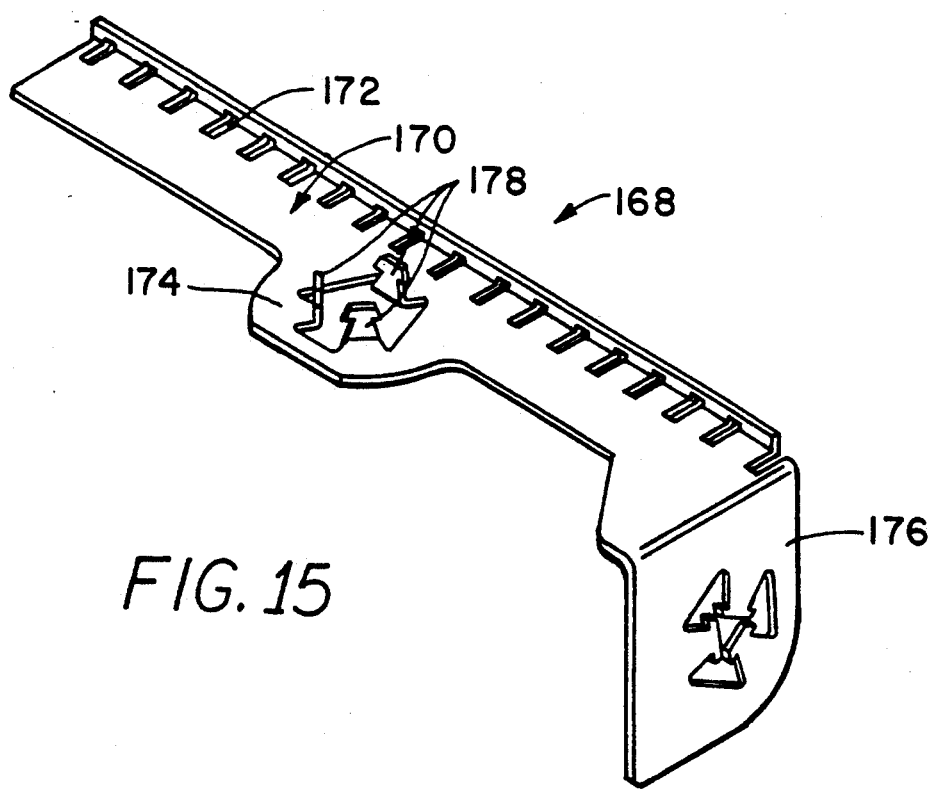
FIG. 15 is a perspective view of a negative busbar suitable for use in a truck or marine application.

FIG. 15 illustrates a negative busbar 168 which may be used for truck or marine applications. In similar fashion to the SLI automotive negative busbar shown in FIG. 14, the negative busbar 168 comprises a top portion 170 having slots 172 for the top terminal tabs, a top terminal portion 174 and a side terminal portion 176. The top terminal tabs 178 impart torque resistance to the particular termination used for the particular application.

As was the case with the positive busbars, the size, number, location and configuration of the top terminal tabs (and side terminal tabs in the case of an SLI automotive battery) can vary as desired, consistent with the object of providing torque resistance for the terminal. Similarly, as was the case with the location of the top terminal portion of the positive busbars, that location in the negative busbars may be altered as considered appropriate for the particular application.

As will be more fully discussed in conjunction with a discussion of the assembly of the battery hereinafter, the positive and negative busbar-terminal assemblies for an SLI automotive battery application preferably include a ramping means to facilitate sliding the cover onto the frame assembly during assembly operation of the battery. Thus, as seen in FIG. 10B, ramp means 180 bridge the top and skirt portions, in effect creating a ramp in which the plastic cover can more easily extend outwardly to slide over the side terminals. This ramp means can be integrally formed with the side terminal, as during die casting.

In accordance with a further aspect of the present invention, the battery is provided with, when it is desired to provide a multiple battery source, a switch means capable of selectively placing the desired battery into service. In the specific embodiment illustrated, the multiple battery source comprises a main battery and a reserve battery. The switch means comprises a switch assembly shown in FIGS. 16A and B and a switch actuator shown in FIG. 17.

Figure 16A:
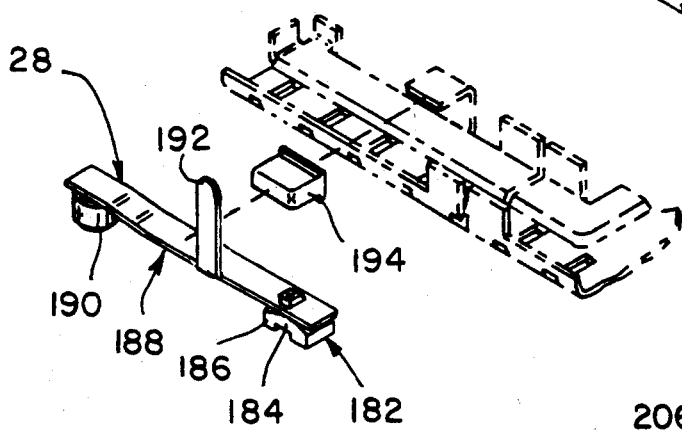
FIG. 16A is a perspective view of a switch assembly used in the modular batteries of the present invention, for applications when it is desired to partition such batteries into two batteries and also showing a portion of a positive busbar in which the switch assembly may be positioned.
Figure 16B:
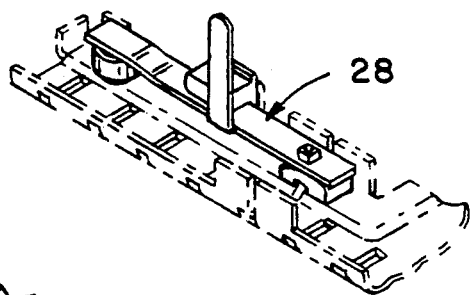
FIG. 16B is a perspective view similar to FIG. 16A and showing the switch assembly in position on the positive busbar.

In general, the switch assembly 28 shown in FIGS. 16A and B comprises electrical contact means capable of bridging the two portions of the positive busbar, an electrically conductive positioning means cooperating with a positioning arm on the positive busbar to suitably locate the switch assembly in the positive busbar and in electrical contact with the electrical contact means, current control means connected to the positioning means and in electrical contact with the portion of the positive busbar for the reserve battery and a switch actuator means allowing the switch assembly to be moved from a forward position where the main battery is in service to a rearward position where the reserve battery is also brought into service. To this end, the exemplary embodiment utilizes as the electrical contact means a copper slug shown generally at 182 having a body portion 184 and feet portion 186. The copper slug 182 can be force fitted into a flexible electrical connection positioning means shown at 188. The positioning means 188 may be made of a copper strip which is flexible enough to be bent downwardly when inserted into the positive busbar, thus assuring that the switch assembly 28 is in its proper position and in electrical contact with the busbar.

The electrical connection means on or adjacent the end of the positioning means 188 opposite the end where the copper slug 182 is positioned provides electrical contact between the positioning means and the portion of the busbar connecting the frame tabs of the terminal frames positioned in the reserve battery. A diode 190 may be employed which can be electrically connected as desired to the positioning means 188. It has been found suitable to solder the diode to the positioning means 188. A medium current, silicon rectifier (rated at 100 volts, 25 amperes) may be employed for the particular applications discussed herein. It is, of course, well within the skill of the art to select the particular diode or other component to satisfy the particular function. The diode or other component employed should desirably allow the reserve battery to remain charged when not in service, but not allow current to be drawn from the reserve battery unless the switch assembly 28 is in the rearward position.

The means allowing the switch assembly 28 to be moved along the busbar comprises an upwardly extending finger 192 connected to the positioning means 188 intermediate the ends. Plastic cap 194 sized to fit over the positioning arm 142 functions to insulate the positioning arm 142 to insure that the function of the diode is not circumvented.

Figure 17:
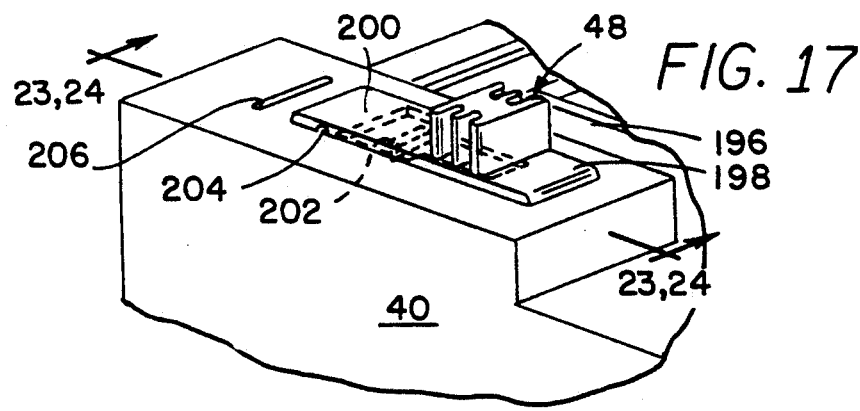
FIG. 17 is a perspective view showing a corner of a battery of the present invention and a switch actuator that may be employed with the switch assembly of FIG. 16.

The finger 192 fits in the underside of a switch actuator shown generally at 48 in FIG. 17. The switch actuator 48 thus comprises a body portion 196 having on its underside a slot to accept the finger 192, a forward end 198, a trailing end 200, a stop means 202 attached to the underside of the trailing end 200, and a recess 204 also on the underside of the trailing end 200.

The switch actuator, as will be more fully discussed hereinafter, fits into the cover of the battery and is accessible from the top of the battery in the fully assembled battery. When it is assembled, the switch actuator 48 is in a forward position so that the main battery is in service. The switch actuator 48 can be moved to a rearward position, determined by stop means 202. The recess 204 cooperates with a rib 206 on the cover so that the user has an audible sense that the switch in fact changed positions. For cosmetic purposes, it is preferred to have the forward and the trailing ends 198 and 200 of sufficient length such that, in both the forward and rearward positions of the switch actuator, the slot in the cover will not be exposed.

Figure 18:
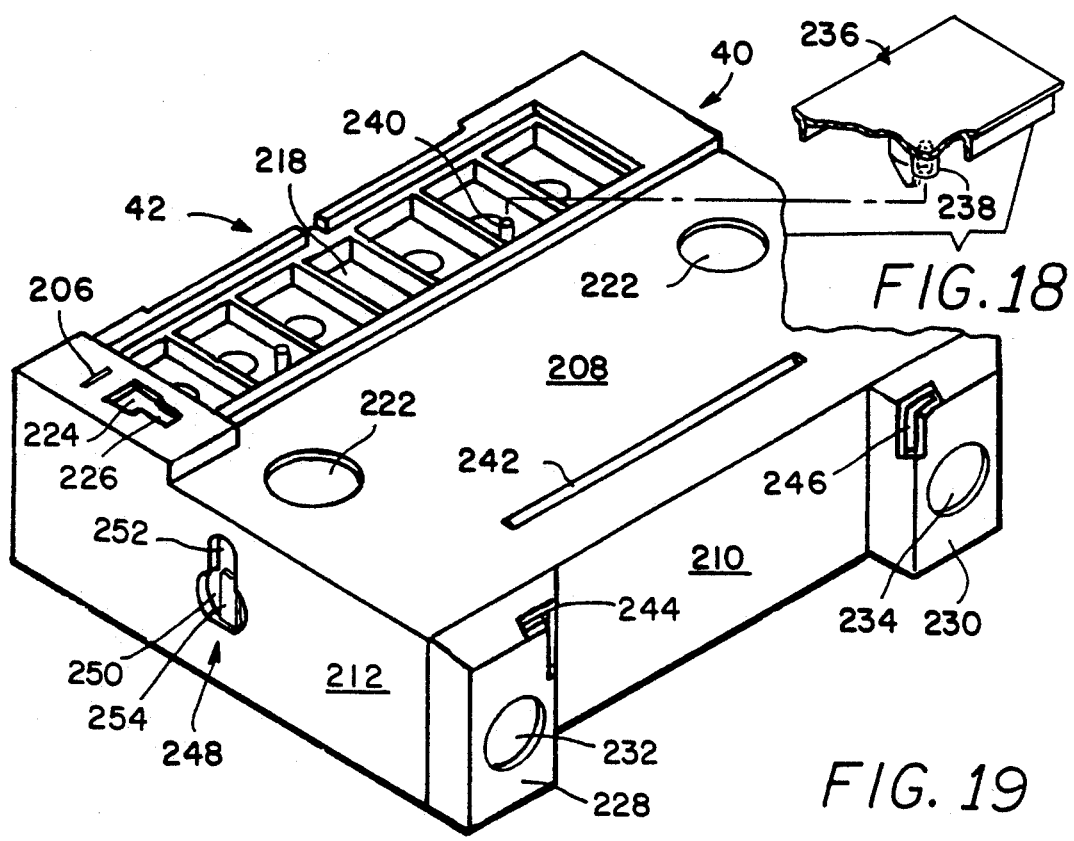
FIG. 18 is a perspective view showing the top of the cover and part of the manifold illustrated in FIG. 1.
Figure 19:
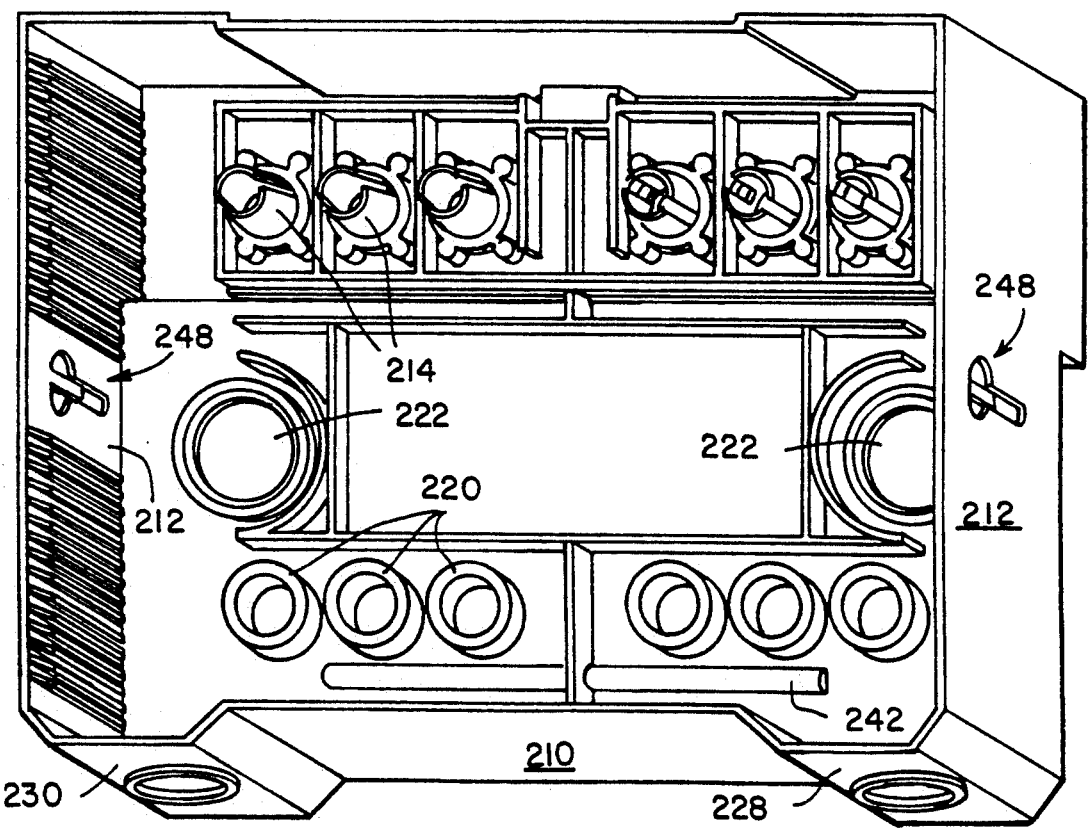
FIG. 19 is a perspective view showing the underside of the cover of FIG. 18.

Pursuant to yet another aspect of the present invention, a preferred embodiment of the present invention utilizes a cover readily adaptable to accept the particular termination means desired and carrying the desired venting system. To this end, FIGS. 18 and 19 show a preferred cover. Thus, as shown in FIG. 18, the cover shown generally at 40 comprises a top portion 208, downwardly depending side skirts 210, and end skirts 212.

In accordance with a preferred embodiment of the present invention, the venting system, shown generally at 42, comprises individual vents 214 for each cell of the reserve battery which are interconnected in a manifold arrangement as is shown. Internal gasses can exit through a safety vent carried in the manifold as shown generally at 216 (as seen in FIG. 1) and fitted into compartment 218 (FIG. 18) in the cover 40. Suitable vents and safety vents are well known in the art. The individual vents 214 for each cell are positioned to fit into the electrolyte fill holes that are drilled in the top of the frame assembly in the reserve battery as will be discussed later.

In the cover embodiment illustrated, the cover 40 includes a series of collars 220 which are so positioned that, when assembled onto the frame assembly, the collars will surround and seal the electrolyte fill holes that are made on top of the battery for each cell of the main battery. When the cover is assembled in position on the frame assembly, the collars 220 thus form an electrolyte, and gas-tight, seal with the top of the frame assembly. Internal gasses developed in the main battery thus migrate through the aperture means 108 in the partition frame 16 into the reserve battery, and exit through the safety vent.

The top 208 of the cover 40 includes apertures 222 allowing the top terminals to extend therethrough and a notched portion 50 comprising a rearward entry portion 224 and a forward key portion 226 for the switch actuator 48. Rib 206 cooperates with recess 204 on the switch actuator 48 to provide the user with an audible indication as movement from the forward to the rearward position occurs, as previously noted.

Side skirt walls 210 of cover 40 have extensions 228 and 230 having, respectively, openings 232 and 234, which accommodate the side terminal portions of the busbars 20 and 30. The ramp means of the busbar-terminal assembly thus allows the side skirts 210 to more readily slide over such busbars and into the proper position over the frame assembly.

As seen in FIG. 18, a manifold 236 can cover the venting system 42. One aspect of the more preferred embodiment of the present invention provides positioning means 238 on the manifold 236 which fit into location pins 240 in the venting system. The manifold 236 may be sealed to the cover 40 by any of the conventional means utilized, such as by heat sealing, ultrasonic welding or the like.

It should, however, be appreciated that some applications may require a removable manifold. Many removable manifolds are known in the art and may be used for such applications.

The top of the cover may also optionally include a recess adjacent the side opposite from the venting system. The recess 242 accepts a portion of the handle when that optional feature is used, as do recesses 244 and 246, as will be hereinafter more fully discussed. The end skirts 212 of the cover 40 optionally include stakes 248 having a handle entry portion 250, an assembled handle key portion 252, and a tab 254 to keep the handle from sliding downward into the handle entry portion after assembly.

An optional feature of the present invention thus provides the battery with a handle to facilitate handling by the user, the illustrated embodiment of a suitable handle being shown in FIGS. 20A and B. The illustrative handle shown generally at 46 thus includes support arms 256 having attachment means shown generally at 258 and a handle carrying means 260 positioned between the ends of the handle. The handle carrying means 260 may, if desired, include a handle strengthening portion shown generally at 262 which seats in recess 242 of the cover 40 so that a generally flat surface is provided when the handle is in its downward profile or position. As may be appreciated, the handle 46 may be snapped into the handle entry portion 250 of the stake 248 and then pulled upwardly into the key portion 252.

The embodiment shown also includes an optional holddown extension for enhancing the versatility of the battery. Thus, a holddown extension 264 is desirably integrally molded via a readily separable flash line to the handle carrying portion. If the bottom dimension of the battery is correctly sized for the holddown, the holddown extension can be removed from the handle and discarded when the battery is placed into service. If, as is the case with certain vehicles, the holddown is slightly larger than the bottom dimensions, the holddown extension 264 can be fitted over the bottom holddown means 116 shown in the end frames in FIG. 6. The handle extension 264 is sized to accommodate those vehicles having a slightly larger holddown. When assembled and ready for shipment, the ends of the holddown extension 264 fits into recesses 244 and 246.

As may be appreciated, the exemplary embodiment illustrates a battery having both top terminals and side terminals. The illustrative cover can obviously be readily adapted to accept only either top terminals or side terminals. Indeed, when only top terminals are to be employed, the same cover mold can be used as for the illustrative embodiment. All that is needed is to use a different die insert. In this case so that no change is needed in the busbars, the insert is such that projections 228 and 230 are replaced by flat projections having no openings and extending only far enough from the cover to accommodate the side or skirt portions of the busbars.

Further, while a gang-type vent system has been illustrated, it should be appreciated that the cover can be readily adapted to accept other types of vent systems. Thus, if desired, each of the electrolyte fill holes could be fitted with an individual vent plug if that configuration is desired. Many such configurations are known in the art. The electrolyte fill holes in the main battery could likewise accommodate, if desired, individual electrolyte fill hole vent plugs.

Pursuant to yet another aspect of the more preferred embodiment of the present invention, the assembled battery provides a relatively flat surface and satisfactorily uniform profile for accommodating those applications where a top holddown is utilized. To this end, the portion of the cover 40 incorporating the venting system shown generally at 42 has a somewhat higher profile than the remainder of the cover. However, when the handle 46 is in its low profile position adjacent the cover, the overall profile of that side of the battery is about the same as that of the other side of the battery with the vent system. A relatively flat and uniform profile is thus provided for accommodating top holddown applications.

The cover and, when used, the manifold cover and handle may be made out of any plastic material useful for lead-acid battery applications. It is, of course, particularly desirable to utilize a plastic that can be desirably processed by the desired technique of choice. Many ethylene-propylene copolymers readily used in automotive battery applications are known and may be employed.

Positioning the venting system in the cover, in accordance with the preferred embodiment of this invention, allows better control of the fill level of the electrolyte. Further, this arrangement maximizes the versatility of the recharge modes that may be employed since the venting system is disposed as far away from the electrolyte level as is possible.

In general, assembly and manufacture of the battery involves first assembling the desired number of sets of terminal and floating frames with the separators suitably positioned therebetween and, when used, a partition frame or frames likewise positioned where desired. The thus-assembled stack of frames may then be sealed together by any of the many techniques available for sealing or securing plastic parts together. It has been found desirable to utilize vibration welding to seal the respective frames together. Suitable vibration welding techniques are well known.

The electrolyte fill holes may then be drilled into the top of the battery so that there is an electrolyte fill hole for each cell in the main and reserve battery (or additional batteries when the battery is partitioned into more than two batteries). As previously discussed, the electrolyte fill holes should be positioned so that the particular cover design employed will have the proper portions in alignment when the cover is fitted over the frame assembly.

The positive and negative busbars may then be assembled with the slots of the respective busbars accepting the positive and negative terminal tabs of the respective terminal frames. The electrical connections may then be made as desired. It has thus been found suitable to bend the tabs over to a position in contact with the main portion of the respective positive and negative busbars and then to attach the respective terminal tabs to the busbars. It has been found particularly desirable to make the electrical connection by wave soldering. Suitable wave soldering techniques are known.

In this fashion, after the respective electrical connections are made, these connections can be readily inspected because these are externally visible. The positioning of the busbars and the terminal tabs also allows wave soldering to be used and to be readily and efficiently carried out at a temperature, and under conditions, suitable to provide uniform soldering. This battery configuration should hopefully totally avoid the use of excess temperatures when the electrical connections are made which could conceivably melt the plastic of the frames so as to possibly create leakage paths.

If desired, the sealed frames can be tested to insure that proper sealing has been achieved. This may be carried out by utilizing conventionally available pressure testers to insure that there are no electrolyte leakage paths.

The two sets of electrolyte fill holes can then be filled with electrolyte to the level desired. This may readily be accomplished by gravity feed of the electrolyte with the level being visible. However, the electrolyte can be added by any suitable technique desired and many are known. The fill level and the specific gravity of the electrolyte may be varied as desired for the particular application. As an illustrative example, it has been found suitable to fill the electrolyte to a point midway between the top of the terminal frame and the top of the hook area with aqueous sulfuric acid electrolyte having a specific gravity of about 1.280.

The battery assembled to this point may then be formed to convert the active material paste into the proper electrochemical active material as is known. Any of a wide variety of known formation techniques can be used.

The versatility and flexibility of the modular, multicell battery of this invention is apparent from the manufacturing process. Even as far downstream in the overall assembly as the modular battery being made is at this point, the battery can be adapted to divide the battery into a main and reserve battery or simply to have a single battery to be put into service.

At this point, if it is desired to provide a main and reserve battery, the bridge means 144 of the positive busbar (see FIG. 8) may be severed. Once the severing operation is complete, such as can be carried out by any known cutting means, the switch assembly is positioned in the busbar in its rearward position.

The cover is then fitted over the top of the sealed frames. To provide additional support for the battery, particularly where a handle is to be employed, the side skirts of the cover may be secured to the battery by any known means. It has been found suitable to ultrasonically weld the cover side skirts to the hook portions of their respective frames.

In addition, the underside of the cover is sealed to the top of the assembled and sealed frames. Any suitable sealing technique may be utilized, and it has been found desirable to utilize heat sealing.

If desired, the top of the assembled frames may be embossed with the configuration of the underside of the cover to enhance the sealing operation. Similarly, if desired, the top of the assembled frames may be fused to provide electrolyte path barriers (e.g., running generally perpendicular to the edges of the tops of the frames) so as to provide even further protection against potential electrolyte leakage.

At this point, to assure that assembly has resulted in satisfactory sealed or welded surfaces, pressure testing may be carried out. Suitable techniques for such testing are known. The manifold cover may then be assembled into position, and heat sealed or otherwise attached to the cover in those embodiments where a removable manifold is not needed.

The switch actuator is then be placed on the finger of the switch actuator and pushed downwardly and into the forward position. This action forces the trailing end of the switch actuator downward into the cover due to the stop on the underside of the cover. Once so assembled, the main battery, but not the reserve battery, is in service. When utilized, the handle can then be placed in position.

Figure 23:
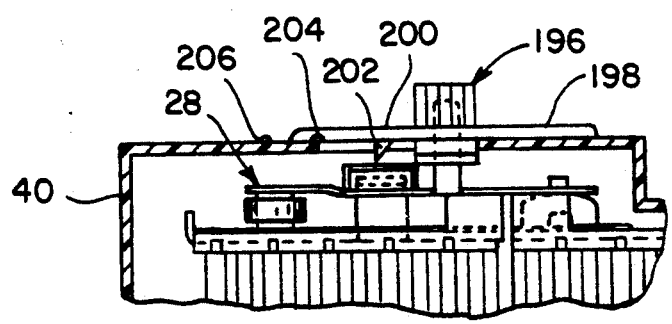
FIG. 23 is a cross-sectional view taken generally along line 23—23 of FIG. 17 and showing the switch in a forward position in which only the main battery is in service.

The assembled battery, indicated generally at 270, is shown in FIG. 21. The cover 40 is sealed to the assembly of frames, the handle 46 is in its low profile position and the switch actuator 48 is in its forward position. As can be seen in FIG. 23, a vent indicated generally at 272 (part of the venting system shown generally at 42 in FIG. 1) fits in an electrolyte fill hole 274.

Figure 24:
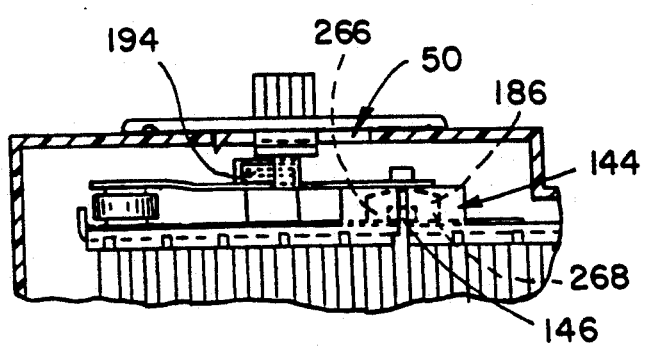
FIG. 24 is a cross-sectional view, similar to FIG. 23, except showing the switch in the rearward position where the reserve battery is also in service.

As seen in FIG. 22, the switch assembly 28 is in its forward position; and the main battery is in service. In FIG. 24, the switch assembly 28 has been moved to its rearward position which also brings the reserve battery into service since the copper slug 182 of the switch assembly 28 bridges the portions 266 and 268 of the positive busbar 20. Accordingly, this embodiment allows the cooperative power to service the particular application, taking advantage of any residual capacity in the discharged main battery.

The exemplary embodiment illustrated provides numerous and significant advantages. By placing the busbar on the top of the battery, the busbar is located as far away from the electrolyte level as is possible. This will enhance resistance to corrosion of the busbar and will allow a more efficient electrical connection of the tabs of the terminal frames to the busbars.

However, while considered less than optimum for most applications, the present invention can accommodate a modular multicell battery in which the busbar is located on the side of the battery as opposed to the top of the battery. While not providing optimum resistance to electrolyte corrosion and while also bringing the soldering or other electrical connection operation closer to the sides of the frames, positioning the busbar on the side of the battery offers many of the advantages of this invention as may be appreciated. Thus, such a configuration can still allow the electrical connections of the busbar to the frame tabs to be visible for inspection as well as also allowing the use of a unitary busbar having the appropriate termination means formed on such busbars. Still further, similar and desirable electrolyte fill and cover and venting means may be likewise employed.

Figure 25:
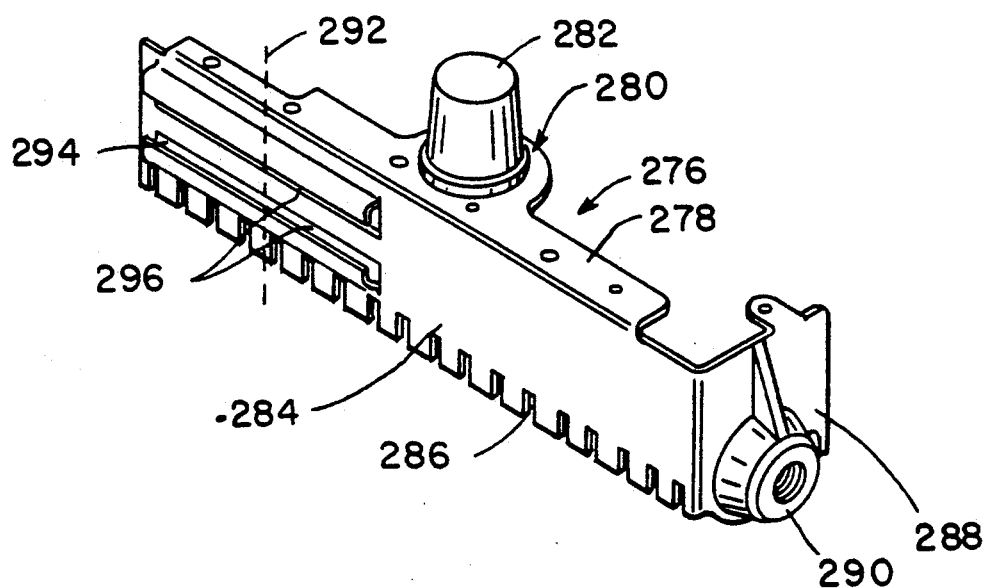
FIG. 25 is a perspective view of an alternative embodiment of a positive busbar that may be utilized.

A number of suitable busbar arrangements can be provided for accommodating frame tabs extending both on the side and on the top. One such busbar configuration for positioning on the side of the battery is illustrated in FIG. 25. As shown, the positive busbar shown generally at 276 includes a top portion 278 having a top termination portion 280 upon which a top terminal 282 is formed and a main busbar portion 284 having a series of slots 286 for accepting the terminal frame tabs. A side terminal portion 288 has a side terminal 290 formed thereon. When a switch-type of battery is desired, the positive busbar 276 can be cut, as at 292. The positive busbar 276 is generally open as indicated at 294 to facilitate the severing operation and includes means for positioning a switch as generally shown at 296. The negative busbar would again be configured similar to the positive busbar, except not providing the switch assembly positioning means 296 as shown for the positive busbar.

Thus, as has been seen, the present invention provides a modular multicell battery that is highly versatile and can be tailored quite readily to a variety of intended applications. The battery should be reliable in performance, utilizes a relatively small number of components and is highly susceptible to effective and efficient manufacturing processes.

More particularly, while it is, of course, unnecessary to utilize partition frames when a switch-type of battery is not desired, the versatility of the assembly process and the battery components employed are such that the partition frames do not need to be eliminated even when only a single battery source is desired.

Similarly, all that is needed to accommodate applications where side termination is not desired is to utilize a different insert for the cover mold and not to form side terminals on the busbars. The rest of the components can be the same.

The same thing is true when top termination is not desired. The cover is made without using an insert to allow apertures for the top terminals, and the busbars are only formed with side terminals.

Similar versatility is provided when, for example, a truck or marine application is involved rather than an SLI automotive application. All that is needed is to utilize the busbars for such applications, form the requisite terminal on such busbars and utilize the cover die inserts suitable for top terminal configuration. Obviously, if desired for any application, the electrolyte fill holes can utilize individual vent plugs as are well known in this field.

It should be appreciated that many variations within the scope of this invention can be made. For example, while the embodiment described herein partitions the multiple service battery into a main and reserve battery, the battery can be readily partitioned into more than two batteries. For example, the various functions in an SLI automotive battery application (e.g., alternator, lights and auxiliaries, starter motor, ignition and computer) could be serviced by a battery divided into four battery sources and utilizing one or more of the battery sources for one or more of the various functions. Similarly, while the embodiment described herein places both the main and reserve batteries into service when the reserve battery is switched into service, it should be appreciated that just the reserve battery could be placed in service, if desired.

Figure 4:
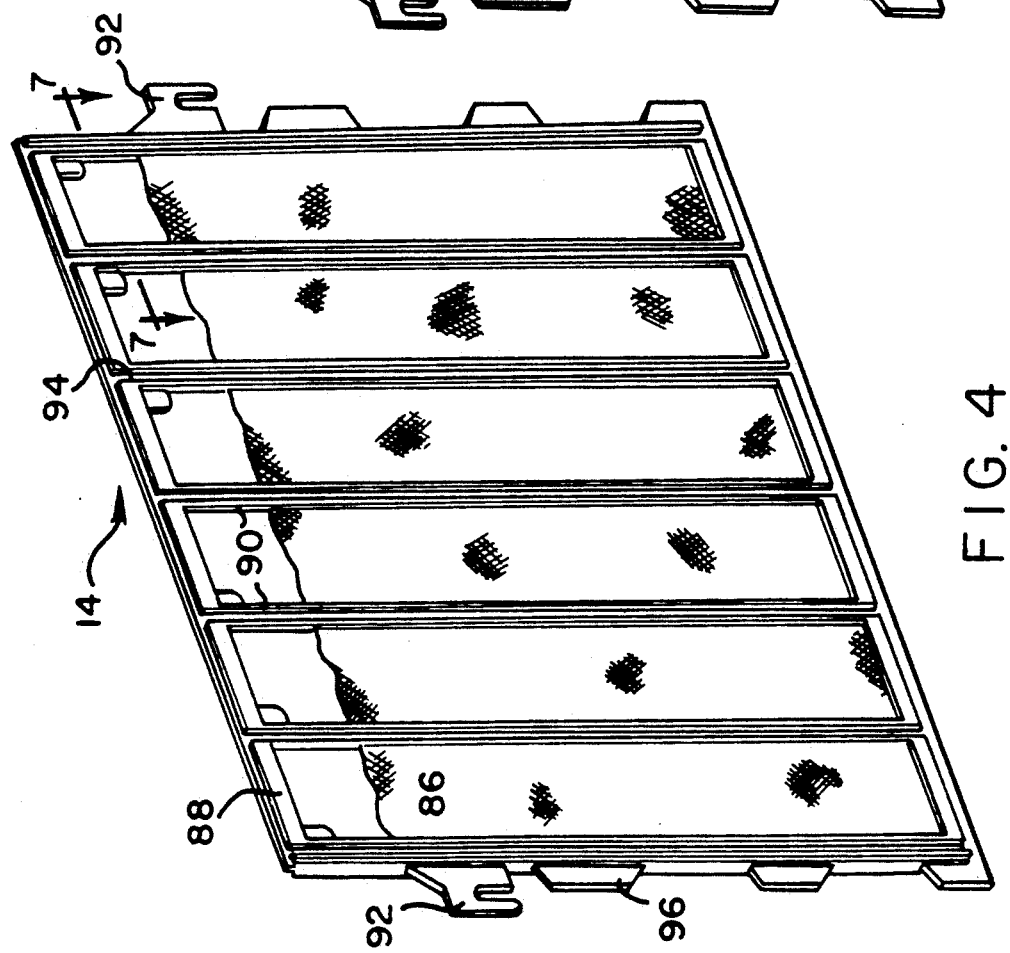
FIG. 4 is a perspective view of a separator frame that may be employed.

Likewise, each battery could be connected so that one power requirement is serviced by one battery and a separate power requirement is serviced by another part of the battery. In this connection, the disclosure of U.S. Pat. No. 4,239,839 illustrating in FIG. 4 suitable circuitry for handling separate functions is herein incorporated by reference, as is the description of such circuitry.

The unique modular configuration of the batteries of this invention are considerably more amenable to accommodating multiple battery source applications than are conventional lead-acid battery configurations. More particularly, as illustrated herein, a switch-type of multiple battery may be readily provided using the modular configuration employed in the present invention. In contrast, making a switch-type battery with conventional lead-acid battery configurations is considerably less efficient.

Similarly, the unique modular configuration of the batteries of the present invention are substantially more adaptable than are conventional lead-acid batteries to applications requiring 24, 36, 48 volts or more. All that is required to form, for example, a 24-volt battery is to position two batteries together with a positive busbar and terminal on a first battery adjacent a negative busbar and terminal of a second battery on one side of the batteries. The frame negative tabs of the first battery and the frame positive tabs of the second battery are then connected together (after formation of the batteries) with a common busbar. In similar fashion, additional batteries could also be joined to provide the overall voltage desired for the particular application.

I claim:

1. A modular multicell lead-acid battery comprising a first assembly of frames, a second assembly of frames, partition means interposed between said first and second assemblies of frames for electrochemically isolating said first and second assemblies from one another so that said battery comprises a first and second multicell battery, each of said first and second assemblies of frames comprising a plurality of terminal and floating frames secured together in side-by-side relation, each frame of each assembly having space division elements defining within the perimeter of the frame a plurality of active material support areas arranged side-by-side across the width of the frame, the perimeter and division elements of the frames in the respective assemblies being secured together in sealed relation so that the perimeters form outer walls of the battery and the division elements form partitions between adjacent cells of the battery, the frame having the perimeter and division elements thereof secured in sealed relation to respective opposite sides of the partition means, an electrically conductive grid embedded in, and supported by, the frame to provide support for active material, said grid having a frame positive and negative tab extending through the perimeter of the frame, active material located in said support areas so that each support area forms a plate of the battery, said active material being selected so that adjacent areas in the same frame form plates of opposite polarity and corresponding support areas in adjacent frames of the same assembly form plates of opposite polarity, an electrolyte separator positioned between the active material of opposite polarity in said corresponding areas in adjacent frames, a positive busbar having a series of slots and said frame positive tabs protruding through said slots and electrically connected thereto, a negative busbar having a series of slots and accepting the frame negative tabs and electrically connected thereto, each of said positive and negative busbars having at least one terminal formed thereon, electrolyte fill holes allowing access for electrolyte to each cell of the battery, electrolyte contained in each cell, a cover overlying the top perimeter of the battery and being sealed to said frames, said terminals extending through said cover, and switch means electrically connected to one of said busbars for allowing current to be drawn from at least one of the first and second multicell batteries.

2. The battery of claim 1 wherein said electrolyte fill holes are positioned in the top of each cell.

3. The battery of claim 2 wherein said cover includes venting means in alignment with said electrolyte fill holes.

4. The battery of claim 3 wherein said cover includes a detachable handle.

5. The battery of claim 4 wherein the portion of the cover including the venting means is of a higher profile than that of the rest of the cover, said handle being rotatable from a high profile position for use in carrying the battery to a low profile position adjacent the cover, the relative profile of the battery when the handle is in the low profile position providing a substantially uniform profile for a top battery holddown.

6. The battery of claim 5 wherein said handle includes a strengthened portion, said cover includes a recessed area and at least part of said strengthened portion rests in said recessed area when said handle is in the low profile position.

7. The battery of claim 3 wherein said venting means includes a safety vent.

8. The battery of claim 3 wherein said tabs of said grids protrude through the top perimeter of the frames and said positive and negative busbars are positioned on the top perimeter of the frames of the battery.

9. The battery of claim 3 wherein each of said busbars has a top and side terminal.

10. The battery of claim 3 wherein said terminal is cast on said busbar.

11. The battery of claim 10 wherein said terminal is die cast.

12. The battery of claim 3 wherein said terminal is a top terminal.

13. The battery of claim 12 wherein said terminal is an automotive terminal.

14. The battery of claim 12 wherein said terminal is a truck terminal.

15. The battery of claim 12 wherein said terminal is a marine terminal.

16. The battery of claim 9 wherein said busbars include a top portion positioned on the top perimeter of the frames of the battery and a downwardly depending skirt portion, a side terminal formed on said skirt portion, and ramp means associated with said side terminal for facilitating slipping said cover over said busbars during assembly.

17. A modular multicell lead-acid battery comprising a first assembly of frames, a second assembly of frames, partition means interposed between said first and second assemblies of frames for electrochemically isolating said first and second assemblies from one another so that said battery comprises a first and second multicell battery, each of said first and second assemblies of frames comprising a plurality of terminal and floating frames secured together in side-by-side relation, each frame of each assembly having space division elements defining within the perimeter of the frame a plurality of active material support areas arranged side-by-side across the width of the frame, the perimeter and division elements of the frames in the respective assemblies being secured together in sealed relation so that the perimeters form outer walls of the battery and the division elements form partitions between adjacent cells of the battery, the frame having the perimeter and division elements thereof secured in sealed relation to respective opposite sides of the partition means, an electrically conductive grid embedded in, and supported by, the frame to provide support for active material, said grid having a frame positive and negative tab extending through the perimeter of the frame, active material located in said support areas so that each support area forms a plate of the battery, said active material being selected so that adjacent areas in the same frame form plates of opposite polarity and corresponding support areas in adjacent frames of the same assembly form plates of opposite polarity, an electrolyte separator positioned between the active material of opposite polarity in said corresponding areas in adjacent frames, a positive busbar having a series of slots and said frame positive tabs protruding through said slots and electrically connected thereto, a negative busbar having a series of slots and accepting the frame negative tabs and electrically connected thereto, each of said positive and negative busbars having at least one terminal formed thereon, electrolyte fill holes allowing access for electrolyte to each cell of the battery, electrolyte contained in each cell, a cover overlying the top perimeter of the battery and being sealed to said frames, said terminals extending through said cover, said partition means having venting means positioned above the electrolyte fill level and allowing communication between each cell of said first and second batteries, said cover having venting means in alignment with the electrolyte fill holes of said second battery and allowing egress of internal gasses in said second battery, the vent means in said partition means allowing egress of gasses generated in said first battery through the venting means in the cover and switch means electrically connected to one of said busbars for allowing current to be drawn from at least one of the first and second multicell batteries.

18. The battery of claim 17 wherein the venting means in said partition means includes at least one aperture communicating between a cell of said first and second batteries.

19. A modular multicell lead-acid battery comprising a first assembly of frames, a second assembly of frames, partition means interposed between said first and second assemblies of frames for electrochemically isolating said first and second assemblies from one another so that said battery comprises a first and second multicell battery, each of said first and second assemblies of frames comprising a plurality of terminal and floating frames secured together in side-by-side relation, each frame of each assembly having space division elements defining within the perimeter of the frame a plurality of active material support areas arranged side-by-side across the width of the frame, the perimeter and division elements of the frames in the respective assemblies being secured together in sealed relation so that the perimeters form outer walls of the battery and the division elements form partitions between adjacent cells of the battery, the frame having the perimeter and division elements thereof secured in sealed relation to respective opposite sides of the partition means, an electrically conductive grid embedded in, and supported by, the frame to provide support for active material, said grid having a frame positive and negative tab extending through the perimeter of the frame, active material located in said support areas so that each support area forms a plate of the battery, said active material being selected so that adjacent areas in the same frame form plates of opposite polarity and corresponding support areas in adjacent frames of the same assembly form plates of opposite polarity, an electrolyte separator positioned between the active material of opposite polarity in said corresponding areas in adjacent frames, a positive busbar having a series of slots and said frame positive tabs protruding through said slots and electrically connected thereto, a negative busbar having a series of slots and accepting the frame negative tabs and electrically connected thereto, each of said positive and negative busbars having at least one terminal formed thereon, electrolyte fill holes allowing access for electrolyte to each cell of the battery, electrolyte contained in each cell, a cover overlying the top perimeter of the battery and being sealed to said frames, said terminals extending through said cover, said partition means having venting means positioned above the electrolyte fill level and allowing communication between each cell of said first and second batteries, said cover having venting means in alignment with the electrolyte fill holes of said second battery and allowing egress of internal gasses in said second battery, the vent means in said partition means allowing egress of gasses generated in said first battery through the venting means in the cover.

20. A modular multicell lead-acid battery comprising a first assembly of frames, a second assembly of frames, partition means interposed between said first and second assemblies of frames for electrochemically isolating said first and second assemblies from one another so that said battery comprises a first and second multicell battery, each of said first and second assemblies of frames comprising a plurality of terminal and floating frames secured together in side-by-side relation, each frame of each assembly having space division elements defining within the perimeter of the frame a plurality of active material support areas arranged side-by-side across the width of the frame, the perimeter and division elements of the frames in the respective assemblies being secured together in sealed relation so that the perimeters form outer walls of the battery and the division elements form partitions between adjacent cells of the battery, the frame having the perimeter and division elements thereof secured in sealed relation to respective opposite sides of the partition means, an electrically conductive grid embedded in, and supported by, the frame to provide support for active material, said grid having a frame positive and negative tab extending through the perimeter of the frame, active material located in said support areas so that each support area forms a plate of the battery, said active material being selected so that adjacent areas in the same frame form plates of opposite polarity and corresponding support areas in adjacent frames of the same assembly form plates of opposite polarity, an electrolyte separator positioned between the active material of opposite polarity in said corresponding areas in adjacent frames, a positive busbar having a series of slots and said frame positive tabs protruding through said slots and electrically connected thereto, a negative busbar having a series of slots and accepting the frame negative tabs and electrically connected thereto, each of said positive and negative busbars having at least one terminal formed thereon, electrolyte fill holes allowing access for electrolyte to each cell of the battery, electrolyte contained in each cell, a cover overlying the top perimeter of the battery and being sealed to said frames, said terminals extending through said cover, said partition means having venting means positioned above the electrolyte fill level and allowing communication between each cell of said first and second batteries, said cover having venting means in alignment with the electrolyte fill holes of said second battery and allowing egress of internal gasses in said second battery, the vent means in said partition means allowing egress of gasses generated in said first battery through the venting means in the cover and switch means electrically connected to one of said busbars for allowing current to be selectively draws from at least said first battery or from both said first and second batteries.

21. The battery of claim 20 wherein said switch means is associated with said positive busbar.

22. The battery of claim 21 wherein said positive busbar comprises a first portion in electrical contact with the frame terminal tabs of said first battery and a second busbar portion in electrical contact with the frame terminal tabs of said second battery and said switch means includes a switch assembly comprising an electrically conductive positioning means for positioning the switch assembly in the positive busbar, current control means in electrical contact with the second battery, electrical contact means connected to said positioning means and capable of slidable movement in said busbar, and switch movement means allowing said switch assembly to be moved from a forward position wherein said electrical contact means is in contact with the first portion of the busbar to a rearward position wherein said electrical contact means is in contact with both the first and second portions of said positive busbar.

23. The battery of claim 22 wherein said positive busbar includes positioning means for locating the switch assembly on said positive busbar.

24. The battery of claim 23 wherein said electrical contact means comprises a diode, said electrically conductive positioning means comprises a copper strip capable of being flexed downwardly when inserted onto the positive busbar and said electrical contact means comprises a copper slug.

25. The battery of claim 24 wherein said cover includes a notched portion, a switch actuator located in the notched portion and connected to the switch movement means for moving the switch assembly from the forward to a rearward position.

26. The battery of claim 2 wherein said switch actuator comprises a body portion for moving the switch assembly from the forward to a rearward position, and a forward and a trailing end, said trailing end having a stop, said stop preventing rearward movement beyond that required for movement from the forward to the rear position.

27. The battery of claim 26 wherein rearward movement of said switch actuator is terminated when said stop abuts the notched portion of said cover, said cover includes a rib adjacent to the notched portion of the cover, and the trailing end of said switch actuator includes a recess on its underside and said rib and said trailing end recess cooperating when said switch actuator is moved to the rearward position to provide an audible indication of the change of position.

28. A modular multicell lead-acid battery comprising an assembly of frames, said assembly of frames comprising a plurality of terminal and floating frames secured together in side-by-side relation, each frame having spaced division elements defining within the perimeter of the frame a plurality of active material support areas arranged side-by-side across the width of the frame, the perimeter and division elements of the frames being secured together in sealed relation so that the perimeters form outer walls of the battery and the division elements form partitions between adjacent cells of the battery, an electrically conducted grid embedded in, and supported by, the frame to provide support for active material, said grid having a frame positive and negative tab extending through the perimeter of the frame, active material located in said support areas so that each support area forms a plate of the battery, said active material being selected so that adjacent areas in the same frame form plates of opposite polarity and corresponding support areas in adjacent frames of the same assembly form plates of opposite polarity, an electrolyte separator positioned between the active material of opposite polarity in said corresponding areas and adjacent frames, a positive busbar having a series of slots and said frame positive tabs protruding through said slots and electrically connected thereto, a negative busbar having a series of slots and accepting the frame negative tabs and electrically connected thereto, each of said positive and negative busbars having at least one terminal formed therein, electrolyte fill holes allowing access for electrolyte to each cell of the battery, electrolyte contained in each cell, a cover overlaying the top perimeter of the battery and being sealed to said frames, said terminals extending through said cover.

29. The battery of claim 28 wherein said cover includes venting means in alignment with said electrolyte fill holes.

30. The battery of claim 29 wherein said electrolyte fill holes are positioned in the top of each cell.

31. The battery of claim 30 wherein said tabs of said grids protrude through the top perimeter of the frames and said positive and negative busbars are positioned on the top perimeter of the frames of the battery.

32. The battery of claim 31 wherein each frame has a pair of hooks extended on the sides of the frame, said cover is secured to said hooks and overlies said hooks, and said battery includes a detachable handle, said handle being attached to the ends of the cover above the position of said hooks.

33. The battery of claim 32 wherein the assembly of frames includes a pair of end frames, said end frames having holddown means suitable for a conventional SLI automotive battery bottom holddown.

34. The battery of claim 33 wherein said handle includes a holddown extension detachable from said handle, said holddown extension cooperating with the bottom holddown means of said end frame to accommodate holddowns requiring an extended size.

35. The battery of claim 28 wherein said busbars include a top portion positioned on the top perimeter of the frames of the battery and a downwardly depending skirt portion, a side terminal formed on said skirt portion, and ramp means associated with said side terminal for facilitating slipping said cover over said busbars during assembly.

36. The battery of claim 29 wherein either the positive or negative busbar includes bridge means electrically connecting said first and second multicell batteries.

37. The battery of claim 35 wherein said positive busbar includes a bridge means.

38. The battery of claim 28 wherein at least one of said positive and negative busbars comprises a main portion having said series of slots for accepting the frame tabs and a terminal portion and terminal tabs upset relative to the main portion of said busbar and configured and located to accept a terminal.

39. The battery of claim 38 wherein both said positive and negative busbars comprise a main portion, at least one terminal portion and terminal tabs for accepting a terminal.

40. The battery of claim 38 wherein each of said positive and negative busbars comprise a main portion having slots for accepting the respective frame tabs, a top terminal portion upon which a top terminal may be formed, top terminal tabs for accepting the top terminal, a skirt portion upon which a side terminal may be formed and side terminal tabs on said skirt portion to accommodate a side terminal, at least one of said side and top terminal tabs being upset relative to said terminal portion for accepting a terminal formed thereon.

41. The battery of claim 40 which includes a terminal cast on the respective terminal portion.

42. The battery of claim 41 wherein said terminal is die cast.

43. The battery of claim 42 wherein said terminal is a top terminal.

44. The battery of claim 43 wherein said terminal is an automotive terminal.

45. The battery of claim 43 wherein said terminal is a truck terminal.

46. The battery of claim 43 wherein said terminal is a marine terminal.

* * * * *

UNITED STATES PATENT AND TRADEMARK OFFICE
CERTIFICATE OF CORRECTION

PATENT NO. : 5,256,502
DATED : October 26, 1993
INVENTOR(S) : WILLIAM H. KUMP

It is certified that error appears in the above-indentified patent and that said Letters Patent is hereby corrected as shown below:

Column 7, line 12, delete "10B" and substitute therefor -- 108 --; and

Column 15, line 47, delete "be".

Column 21, line 42, delete "draws" and substitute therefor -- drawn --;

Column 22, line 12, delete "2" and substitute therefor -- 25 --; and

Column 23, line 25, delete "29" and substitute therefor -- 19 --.

Signed and Sealed this

Sixth Day of September, 1994

BRUCE LEHMAN

Attest:

Attesting Officer

Commissioner of Patents and Trademarks